United States Patent
Seol et al.

(10) Patent No.: US 12,328,212 B2
(45) Date of Patent: Jun. 10, 2025

(54) TRANSMITTING CIRCUIT PROVIDING ENCODED DATA, ELECTRONIC DEVICE INCLUDING THE SAME, AND METHOD OF OPERATING THE ELECTRONIC DEVICE INCLUDING THE SAME

(71) Applicant: Samsung Electronics Co., Ltd., Suwon-si (KR)

(72) Inventors: Changkyu Seol, Suwon-si (KR); Daewook Kim, Suwon-si (KR); Jinsoo Lim, Suwon-si (KR); Youngdon Choi, Suwon-si (KR); Junghwan Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 14 days.

(21) Appl. No.: 18/470,760

(22) Filed: Sep. 20, 2023

(65) Prior Publication Data

US 2024/0305510 A1     Sep. 12, 2024

(30) Foreign Application Priority Data

Mar. 6, 2023    (KR) .......................... 10-2023-0029353

(51) Int. Cl.
*H04L 27/04*     (2006.01)
*H04L 1/00*      (2006.01)
(Continued)

(52) U.S. Cl.
CPC ............ *H04L 27/04* (2013.01); *H04L 1/0047* (2013.01); *H04L 27/2007* (2013.01)

(58) Field of Classification Search
CPC ......... H04L 27/02; H04L 27/04; H04L 27/06; H04L 27/08; H04L 27/20; H04L 27/2003;
(Continued)

(56) References Cited

U.S. PATENT DOCUMENTS 7,496,028 B2 *   2/2009   Jung .................... H04L 27/2618
                                                                375/259
7,535,869 B2 *   5/2009   Yoon ..................... H04L 5/0046
                                                                455/511
(Continued)

FOREIGN PATENT DOCUMENTS

EP      4057516 A1    9/2022
JP      5485736 B2    2/2014
KR    102254337 B1    5/2021

*Primary Examiner* — James M Perez
(74) *Attorney, Agent, or Firm* — Myers Bigel, P.A.

(57) ABSTRACT

Disclosed is a method of operating an electronic device which communicates with an external electronic device. The method includes loading first user data including at least one first condition bit, first valid bits, and second valid bits, generating first and second intermediate data based on the first user data with reference to a target conversion rule of a conversion table of the electronic device, which corresponds to the at least one first condition bit, a sum of a first power value corresponding to the first intermediate data and a second power value corresponding to the second intermediate data being less than or equal to a power threshold value, generating first symbol data by performing first encoding on the first intermediate data, generating second symbol data by performing second encoding on the second intermediate data, and providing first encoded data including the first symbol data and the second symbol data.

20 Claims, 15 Drawing Sheets

(51) Int. Cl.
*H04L 27/00* (2006.01)
*H04L 27/20* (2006.01)

(58) Field of Classification Search
CPC ... H04L 27/2007; H04L 1/004; H04L 1/0045; H04L 1/0047; H04L 25/38; H04L 25/40; H04L 25/49; H04L 25/4906; H04L 25/4915
See application file for complete search history.

(56) References Cited

U.S. PATENT DOCUMENTS

| | | | | |
|---|---|---|---|---|
| 8,494,081 B2* | 7/2013 | Takahashi | | H04L 25/4917 375/301 |
| 9,172,567 B2* | 10/2015 | Hollis | | H03M 5/02 |
| 9,270,507 B2* | 2/2016 | Hekmat | | H04L 25/4917 |
| 9,564,990 B1* | 2/2017 | Tiruvur | | H04L 1/0045 |
| 9,635,621 B2* | 4/2017 | Papasakellariou | | H04W 52/34 |
| 10,142,945 B2* | 11/2018 | Papasakellariou | | H04W 52/34 |
| 10,404,505 B1* | 9/2019 | Wilson | | H04N 19/184 |
| 10,461,890 B2* | 10/2019 | Ahn | | H04L 25/03057 |
| 10,966,165 B2* | 3/2021 | Papasakellariou | | H04W 52/367 |
| 11,050,478 B2* | 6/2021 | Guo | | H04L 27/2607 |
| 11,121,726 B2* | 9/2021 | Wang | | H04L 1/0047 |
| 11,146,430 B1* | 10/2021 | Lee | | H04L 25/4908 |
| 11,218,343 B2* | 1/2022 | Park | | H04L 25/14 |
| 11,362,868 B2* | 6/2022 | Seol | | H04L 1/0041 |
| 11,387,852 B2* | 7/2022 | Banin | | H04L 25/49 |
| 11,560,791 B2* | 1/2023 | Kucherenko | | H04L 27/02 |
| 11,594,267 B2* | 2/2023 | Lee | | G11C 7/222 |
| 11,627,021 B2* | 4/2023 | Park | | H04L 25/0272 375/286 |
| 11,695,523 B2* | 7/2023 | Yoshida | | H04L 25/03866 370/329 |
| 11,757,567 B2* | 9/2023 | Seol | | H04L 25/4917 714/746 |
| 11,822,492 B2* | 11/2023 | Seol | | H04L 25/4915 |
| 11,824,563 B2* | 11/2023 | Seol | | H04L 25/4917 |
| 11,888,654 B2* | 1/2024 | Kim | | H04L 25/03006 |
| 11,997,665 B2* | 5/2024 | Guo | | H04L 5/0051 |
| 2004/0136314 A1* | 7/2004 | Jung | | H04L 27/2618 370/478 |
| 2005/0068884 A1* | 3/2005 | Yoon | | H04L 5/006 370/203 |
| 2014/0314172 A1* | 10/2014 | Hekmat | | H03M 5/20 375/286 |
| 2015/0229325 A1* | 8/2015 | Hollis | | G06F 13/4221 710/106 |
| 2019/0305765 A1* | 10/2019 | Lee | | G06F 13/4282 |
| 2020/0007364 A1* | 1/2020 | Akasaka | | H04L 25/4923 |
| 2020/0059387 A1* | 2/2020 | Murakami | | H04L 5/0023 |
| 2020/0212943 A1* | 7/2020 | Banin | | H04B 1/04 |
| 2021/0140308 A1* | 5/2021 | Kucherenko | | H04L 27/02 |
| 2021/0160109 A1* | 5/2021 | Seol | | H04L 27/06 |
| 2021/0336733 A1* | 10/2021 | Yoshida | | H04L 25/49 |
| 2021/0351791 A1* | 11/2021 | Lee | | H03M 13/251 |
| 2021/0377080 A1* | 12/2021 | Park | | H04L 25/14 |
| 2022/0068331 A1* | 3/2022 | Lee | | G11C 7/1006 |
| 2022/0123967 A1* | 4/2022 | Park | | H04L 25/14 |
| 2022/0224583 A1* | 7/2022 | Rosenthal | | H04L 27/02 |
| 2022/0294476 A1* | 9/2022 | Seol | | H03M 5/20 |
| 2022/0294554 A1* | 9/2022 | Seol | | H04L 1/0041 |
| 2023/0171132 A1* | 6/2023 | Kim | | G01R 31/31703 375/340 |
| 2024/0030935 A1* | 1/2024 | Seol | | H04L 25/4917 |
| 2024/0305510 A1* | 9/2024 | Seol | | H04L 1/0047 |
| 2024/0329715 A1* | 10/2024 | Jain | | G06F 1/3215 |

* cited by examiner

FIG. 7

1st Translation Table

| 1st Intermediate Data (ID1 = IB[0:4]) | 1st Symbol Data (SD1 = SB[0:5]) | | | Power Value | Translation Type |
|---|---|---|---|---|---|
| | SY1 = SB[0:1] | SY2 = SB[2:3] | SY3 = SB[4:5] | | |
| 00000 | 3 | 1 | 3 | 3 | A (Power Value Range: 0~3) |
| 00001 | 3 | 3 | 1 | 3 | A (Power Value Range: 0~3) |
| 00010 | 3 | 3 | 3 | 0 | A (Power Value Range: 0~3) |
| 00011 | 1 | 3 | 3 | 3 | A (Power Value Range: 0~3) |
| 00100 | 3 | 0 | 3 | 4 | B (Power Value Range: 4~6) |
| 00101 | 3 | 3 | 0 | 4 | B (Power Value Range: 4~6) |
| 00110 | 0 | 3 | 3 | 4 | B (Power Value Range: 4~6) |
| 00111 | 1 | 3 | 1 | 6 | B (Power Value Range: 4~6) |
| 01000 | 1 | 0 | 3 | 7 | C (Power Value Range: 6~7) |
| 01001 | 3 | 1 | 1 | 6 | C (Power Value Range: 6~7) |
| 01010 | 0 | 1 | 3 | 7 | C (Power Value Range: 6~7) |
| 01011 | 1 | 1 | 1 | 6 | C (Power Value Range: 6~7) |
| 01100 | 3 | 0 | 1 | 7 | C (Power Value Range: 6~7) |
| 01101 | 3 | 1 | 0 | 7 | C (Power Value Range: 6~7) |
| 01110 | 0 | 3 | 1 | 7 | C (Power Value Range: 6~7) |
| 01111 | 1 | 3 | 0 | 7 | C (Power Value Range: 6~7) |
| 10000 | 0 | 0 | 3 | 8 | D (Power Value Range: 8~11) |
| 10001 | 1 | 0 | 1 | 10 | D (Power Value Range: 8~11) |
| 10010 | 0 | 1 | 1 | 10 | D (Power Value Range: 8~11) |
| 10011 | 1 | 1 | 0 | 9 | D (Power Value Range: 8~11) |
| 10100 | 3 | 0 | 0 | 8 | D (Power Value Range: 8~11) |
| 10101 | 1 | 0 | 0 | 11 | D (Power Value Range: 8~11) |
| 10110 | 0 | 3 | 0 | 8 | D (Power Value Range: 8~11) |
| 10111 | 1 | 1 | 0 | 10 | D (Power Value Range: 8~11) |

FIG. 8

2nd Translation Table

| 2nd Intermediate Data (ID2 = IB[5:10]) | | 2nd Symbol Data (SD2 = SB[6:13]) | | | | Translation Type |
|---|---|---|---|---|---|---|
| IB[5] | IB[6:10] | SY4 = SB[6:7] | SY5 = SB[8:9] | SY6 = SB[10:11] | SY7 = SB[12:13] | |
| 0 | (reserved) | | | | | - |
| 0 | 00100:00111 | 3 (Power Value: 0) | (Similarly to translation type B) | (Similarly to translation type B) | (Similarly to translation type B) | E2 — E (Power Value Range: 0~7) |
| 0 | 01000:01111 | 3 (Power Value: 0) | (Similarly to translation type C) | (Similarly to translation type C) | (Similarly to translation type C) | E3 |
| 0 | 00000:00011 | 3 (Power Value: 0) | (Similarly to translation type A) | (Similarly to translation type A) | (Similarly to translation type A) | F1 — F (Power Value Range: 3~10) |
| 1 | (reserved) | | | | | - |
| 1 | 01000:01111 | 1 (Power Value: 3) | (Similarly to translation type C) | (Similarly to translation type C) | (Similarly to translation type C) | F3 |
| 1 | 00000:00011 | 0 (Power Value: 4) | (Similarly to translation type A) | (Similarly to translation type A) | (Similarly to translation type A) | G1 — G (Power Value Range: 4~11) |
| 1 | 00100:00111 | 0 (Power Value: 4) | (Similarly to translation type B) | (Similarly to translation type B) | (Similarly to translation type B) | G2 |
| 0 | (reserved) | | | | | - |
| 0 | 10000:10111 | 3 (Power Value: 0) | (Similarly to translation type D) | (Similarly to translation type D) | (Similarly to translation type D) | H (Power Value Range: 8~11) |
| 1 | 10000:10111 | 1 (Power Value: 3) | (Similarly to translation type D) | (Similarly to translation type D) | (Similarly to translation type D) | J (Power Value Range: 11~14) |

FIG. 10

| | 1st Embodiment (Reference) | 2nd Embodiment (Low power) | 3rd Embodiment (Low power & small size) |
|---|---|---|---|
| Average Power Value (DC Voltage Cost) | 2.28125 | 1.780 (22% reduced) | 1.819 (20.3% reduced) |
| Total Area (Chip Size) | 24.22 | 213.876 (8.83 times increased) | 44.577 (1.84 times increased) |

# TRANSMITTING CIRCUIT PROVIDING ENCODED DATA, ELECTRONIC DEVICE INCLUDING THE SAME, AND METHOD OF OPERATING THE ELECTRONIC DEVICE INCLUDING THE SAME

CROSS-REFERENCE TO RELATED APPLICATION

This application claims priority under 35 U.S.C. § 119 to Korean Patent Application No. 10-2023-0029353, filed on Mar. 6, 2023, in the Korean Intellectual Property Office, the disclosure of which is incorporated by reference herein in their entireties.

BACKGROUND

Embodiments of the present disclosure described herein relate to encoding data of a memory device, and more particularly, relate to a transmitting circuit configured to provide encoded data, an electronic device including the same, and a method of operating the electronic device including the same.

A memory device stores data in response to a write request and outputs data stored therein in response to a read request. For example, a memory device may be classified as a volatile memory device, which loses data stored therein when power is turned off, such as a dynamic random access memory (DRAM) device or a static RAM (SRAM) device, or a non-volatile memory device, which retains data stored therein even when power is turned off, such as a flash memory device, a phase-change RAM (PRAM), a magnetic RAM (MRAM), or a resistive RAM (RRAM).

A memory device may transmit data in the form of an electrical signal. Power consumption for data transmission may change depending on the content (e.g., bit values) of data. To reduce power consumption, instead of transmitting user data without modification, the memory device may encode the user data, such that patterns of bits causing high power consumption decrease. As rules of the encoding are subdivided, power consumption may decrease, but a chip size of an encoding circuit may increase.

SUMMARY

Embodiments of the present disclosure provide a transmitting circuit configured to provide encoded data, an electronic device including the same, and a method of operating the electronic device including the same.

According to an embodiment, a method of operating an electronic device which communicates with an external electronic device includes loading, by a first transmitting circuit of the electronic device, first user data including at least one first condition bit, first valid bits, and second valid bits, generating, by the first transmitting circuit, first intermediate data and second intermediate data based on the first user data with reference to a target conversion rule of a conversion table of the electronic device, which corresponds to the at least one first condition bit, wherein a sum of a first power value corresponding to the first intermediate data and a second power value corresponding to the second intermediate data is less than or equal to a power threshold value, generating, by the first transmitting circuit, first symbol data by performing first encoding on the first intermediate data, generating, by the first transmitting circuit, second symbol data by performing second encoding on the second intermediate data, and providing, by the first transmitting circuit, first encoded data including the first symbol data and the second symbol data to a first receiving circuit of the external electronic device.

According to an embodiment, a transmitting circuit includes a data queue that stores user data including at least one condition bit, first valid bits, and second valid bits, a conversion table that stores a plurality of conversion rules, an encoding circuit, and a transmitter that provides encoded data to a receiver. The encoding circuit receives the user data from the data queue, generates first intermediate data and second intermediate data based on the user data with reference to a target conversion rule corresponding to the at least one condition bit from among the plurality of conversion rules of the conversion table, generates first symbol data by performing first encoding on the first intermediate data, generates second symbol data by performing second encoding on the second intermediate data, and generates the encoded data by serializing the first symbol data and the second symbol data. Each of a plurality of maximum power values corresponding to the plurality of conversion rules is less than or equal to a power threshold value.

According to an embodiment, an electronic device communicates with an external electronic device. The electronic device includes a conversion table that stores a plurality of conversion rules, a transmitting circuit that generates first encoded data based on first user data with reference to the conversion table and provides the first encoded data to the external electronic device, a recovery table that stores a plurality of recovery rules, and a receiving circuit that receives second encoded data from the external electronic device and generates second user data based on the second encoded data with reference to the recovery table. The transmitting circuit loads the first user data including at least one first condition bit, first valid bits, and second valid bits from a first data queue of the transmitting circuit, generates first intermediate data and second intermediate data based on the first user data with reference to a target conversion rule corresponding to the at least one first condition bit from among the plurality of conversion rules of the conversion table, generates first symbol data by performing first encoding on the first intermediate data, generates second symbol data by performing second encoding on the second intermediate data, and generate the first encoded data by serializing the first symbol data and the second symbol data. Each of a plurality of maximum power values corresponding to the plurality of conversion rules is less than or equal to a power threshold value.

BRIEF DESCRIPTION OF THE FIGURES

The above and other objects and features of the present disclosure will become apparent by describing in detail embodiments thereof with reference to the accompanying drawings.

FIG. 7 is a diagram illustrating a first translation table according to some embodiments of the present disclosure.

FIG. 8 is a diagram illustrating a second translation table according to some embodiments of the present disclosure.

FIG. 10 is a table illustrating an average power value and a total area of electronic systems according to some embodiments of the present disclosure.

DETAILED DESCRIPTION

Figure 1:
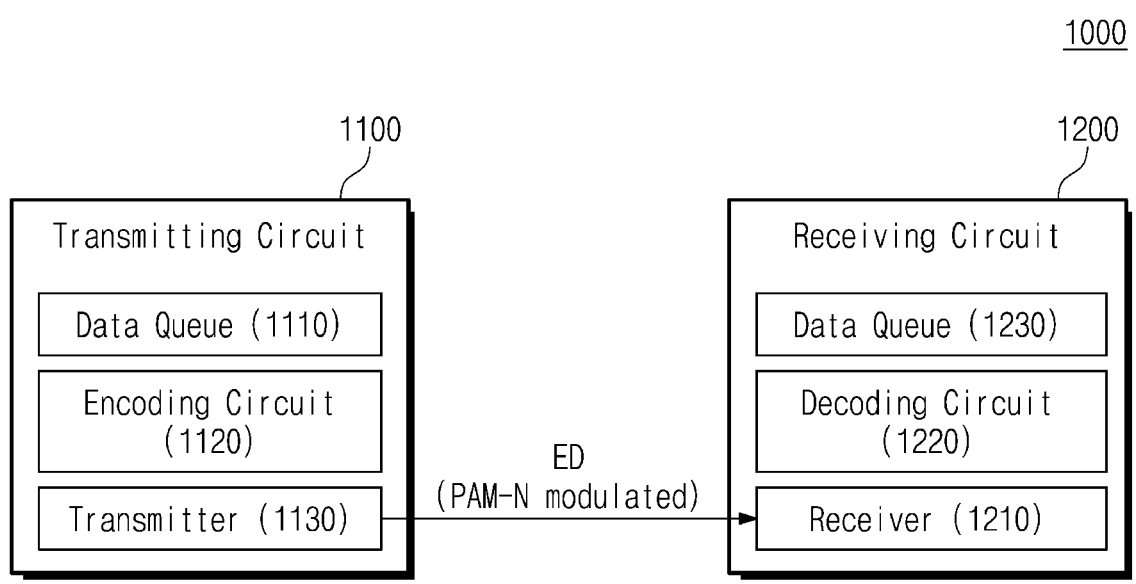
FIG. 1 is a block diagram of an electronic system according to an embodiment of the present disclosure.

Below, embodiments of the present disclosure will be described in detail and clearly with reference to the accompanying drawings to such an extent that one skilled in the art carries out embodiments of the present disclosure easily. The same reference numerals are used for the same components in the drawings, and duplicate descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination. In the present specification, although terms such as first and second are used to describe various elements or components, it goes without saying that these elements or components are not limited by these terms. These terms are only used to distinguish a single element or component from other elements or components. Therefore, it goes without saying that a first element or component referred to below may be a second element or component within the technical idea of embodiments of the present inventive concept.

FIG. 1 is a block diagram of an electronic system according to an embodiment of the present disclosure. Referring to FIG. 1, an electronic system 1000 may include a transmitting circuit 1100 and a receiving circuit 1200. The electronic system 1000 may be configured to support data transmission between different electronic devices. For example, the electronic system 1000 may include a first electronic device and a second electronic device. The first electronic device may include the transmitting circuit 1100. The second electronic device may include the receiving circuit 1200. The first electronic device and the second electronic device may be configured to communicate data through the transmitting circuit 1100 and the receiving circuit 1200.

In some embodiments, the electronic system 1000 may be configured to store data and may be configured to manage the stored data. The electronic system 1000 may be implemented with a memory device. For example, the electronic system 1000 may be implemented with a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

The transmitting circuit 1100 may include a data queue 1110, an encoding circuit 1120, and a transmitter 1130. The data queue 1110 may be configured to store user data. For example, the data queue 1110 may be implemented with a buffer memory configured to temporarily store or buffer the user data. The data queue 1110 may provide the user data to the encoding circuit 1120.

The encoding circuit 1120 may be configured to receive the user data from the data queue 1110. The encoding circuit 1120 may be configured to encode the user data to generate encoded data ED. The encoding circuit 1120 may be configured to provide the encoded data ED to the transmitter 1130.

The encoding circuit 1120 may support a pulse-amplitude modulation (PAM) encoding scheme. For example, the encoding circuit 1120 may be configured to generate the encoded data ED by converting the user data based on N-level PAM (PAM-N) encoding. Herein, "N" is an arbitrary natural number. The PAM-N encoding may be used to generate a pulse corresponding to one of N different voltage levels (i.e., amplitudes) based on the user data. The pulse may be referred to as a "symbol". The symbol may correspond to two or more symbol bits and may be referred to as a 'bit pattern".

For example, when the encoding circuit 1120 supports PAM-4 encoding, a symbol of the encoded data ED may have one of first to fourth symbol values. The first symbol value may correspond to symbol bit representation "00", the second symbol value may correspond to symbol bit representation "01", the third symbol value may correspond to symbol bit representation "10", and the fourth symbol value may correspond to symbol bit representation "11". The first to fourth symbol values may respectively correspond to first to fourth voltage levels being different from each other. A power value used by the transmitting circuit 1100 to transmit a symbol may change depending on a symbol value.

As another example, when the encoding circuit 1120 supports PAM-3 encoding, a symbol of the encoded data ED may have one of the first to third symbol values. The first to third symbol values may respectively correspond to symbol bit representation "00", symbol bit representation "10", and symbol bit representation "11". In the PAM-3 encoding, a symbol value corresponding to symbol bit representation "01" may not be used. The first to third symbol values may respectively correspond to the first to third voltage levels being different from each other. A power value necessary for the transmitting circuit 1100 to transmit a symbol may change depending on a symbol value. The PAM-3 modulation scheme will be described in detail with reference to FIG. 5.

To reduce power consumption for data transmission between the transmitting circuit 1100 and the receiving circuit 1200, the encoding circuit 1120 may support low-power PAM-N encoding. For example, the user data may be converted into the encoded data ED based on conventional PAM-N encoding. Each of symbols of the encoded data ED may have one of first to N-th symbol values. Because the user data have arbitrary bit values, stochastically, the number of each of the first to N-th symbol values may be similar to each other. A power value used for transmitting the N-th symbol value from among power values used for transmitting the first to N-th symbol values may be the smallest.

According to the low-power PAM-N encoding, the user data may be converted into the encoded data ED by adding dummy bits (e.g., bits irrelevant to the user data) or changing bit values such that a bit pattern of the N-th symbol value is frequently generated. According to the encoded data ED thus converted, a bit pattern (e.g., the first to (N−1)-th symbol values) causing high power consumption may decrease, and a bit pattern (e.g., the N-th symbol value) causing low power consumption may increase; in this case, power consumption for transmission of the encoded data ED may be reduced.

The transmitter 1130 may be configured to receive the encoded data ED from the encoding circuit 1120. The transmitter 1130 may provide the encoded data ED to the receiving circuit 1200. For example, the encoded data ED may refer to an electrical signal modulated by an N-level PAM technique. The transmitter 1130 may be configured to output the encoded data ED to the receiving circuit 1200 over a transmission channel.

The receiving circuit 1200 may include a receiver 1210, a decoding circuit 1220, and a data queue 1230. The receiver 1210 may receive the encoded data ED from the transmitter 1130 of the transmitting circuit 1100. The receiver 1210 may provide the encoded data ED to the decoding circuit 1220.

The decoding circuit 1220 may be configured to receive the encoded data ED from the receiver 1210. The decoding circuit 1220 may be configured to decode the encoded data ED to generate the user data. The decoding circuit 1220 may be configured to provide the user data to the data queue 1230.

The decoding circuit 1220 may support PAM_N decoding. The PAM decoding supported by the decoding circuit 1220 may correspond to the PAM encoding supported by the encoding circuit 1120. For example, when the encoding circuit 1120 supports PAM-4 encoding, the decoding circuit 1220 may support PAM-4 decoding. When the encoding circuit 1120 supports PAM-3 encoding, the decoding circuit 1220 may support PAM-3 decoding. The content of the user data (e.g., bit values of the user data) generated by the decoding of the decoding circuit 1220 may be the same as the content of the user data stored in the data queue 1110 of the transmitting circuit 1100.

The data queue 1230 may be configured to receive the user data from the decoding circuit 1220. The data queue 1230 may store the user data. For example, the data queue 1230 may be implemented with a buffer memory configured to temporarily store or buffer the user data.

Figure 2:
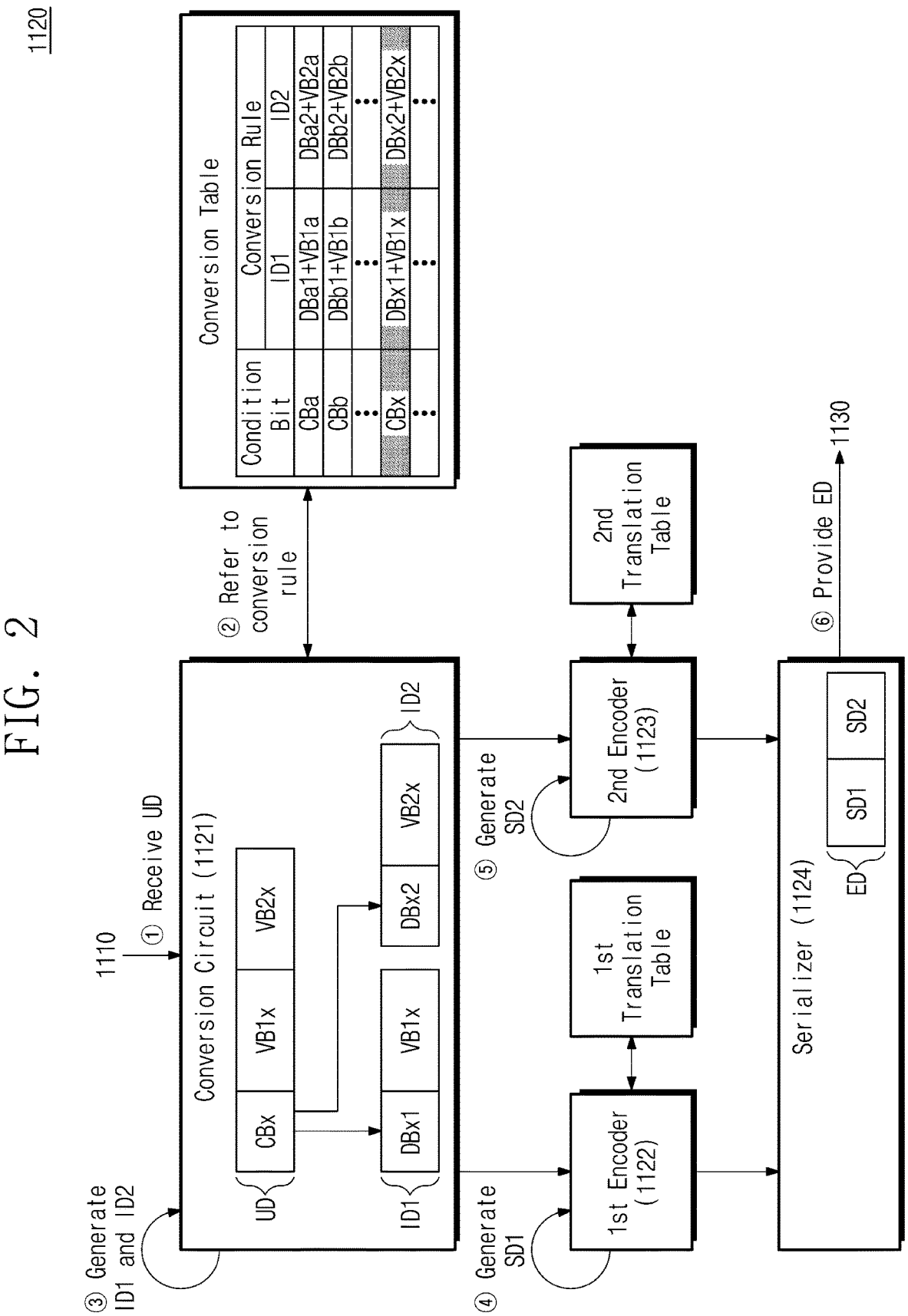
FIG. 2 is a diagram illustrating a method of operating an encoding circuit of FIG. 1, according to some embodiments of the present disclosure.

FIG. 2 is a diagram illustrating a method of operating an encoding circuit of FIG. 1, according to some embodiments of the present disclosure. Referring to FIGS. 1 and 2, the encoding circuit 1120 may receive user data UD from the data queue 1110. The encoding circuit 1120 may be configured to generate the encoded data ED based on the user data UD. The encoding circuit 1120 may be configured to provide the encoded data ED to the transmitter 1130.

The encoding circuit 1120 may include a conversion circuit 1121, a first encoder 1122, a second encoder 1123, and a serializer 1124. In some embodiments, the encoding circuit 1120 may further include a conversion table, a first translation table, and a second translation table. In some other embodiments, the encoding circuit 1120 may refer to the conversion table, the first translation table, and the second translation table implemented as external circuits of the transmitting circuit 1100.

The conversion circuit 1121 may refer to the conversion table and may generate first intermediate data ID1 and second intermediate data ID2 based on the user data UD. The conversion circuit 1121 and the conversion table may be separate circuits, modules, or blocks or may be implemented with one integrated circuit, module, or block.

For example, the transmitting circuit 1100 may include a processor and a memory. The conversion circuit 1121 and the conversion table may be implemented by Python code-based instructions. The processor may be configured to generate the first and second intermediate data ID1 and ID2 from the user data UD in compliance with a conversion rule, by loading instructions to the memory and executing the loaded instructions.

As another example, the conversion circuit 1121 may include logic circuit that operates in compliance with conversion rules of the conversion table. The logic circuits may generate the first and second intermediate data ID1 and ID2 from the user data UD, by performing various logic operations such as an OR operation, an AND operation, and a NOT operation.

The first encoder 1122 may refer to the first translation table and may be configured to generate first symbol data SD1 based on the first intermediate data ID1. The first encoder 1122 and the first translation table may be separate circuits, modules, or blocks or may be implemented with one integrated circuit, module, or block. For example, the first encoder 1122 and the first translation table may be implemented by instructions stored in a computer readable medium or may be implemented with logic circuits.

The second encoder 1123 may refer to the second translation table and may be configured to generate second symbol data SD2 based on the second intermediate data ID2. The second encoder 1123 and the second translation table may be separate circuits, modules, or blocks or may be implemented with one integrated circuit, module, or block. For example, the second encoder 1123 and the second translation table may be implemented by instructions stored in a computer readable medium or may be implemented with logic circuits.

The serializer 1124 may be configured to generate the encoded data ED by serializing the first symbol data SD1 and the second symbol data SD2. For example, the serializer 1124 may include a parallel in serial out (PISO) block.

Below, a method of operating the encoding circuit 1120 according to some embodiments will be described in detail with reference to FIG. 2.

In a first operation ①, the conversion circuit 1121 may receive the user data UD from the data queue 1110. The user data UD may include condition bits CBx, first valid bits VB1$x$, and second valid bits VB2$x$. For better understanding of the present disclosure, the condition bits CBx, the first valid bits VB1$x$, and the second valid bits VB2$x$ are described in the plural form; however, according to embodiments, the condition bits CBx, the first valid bits VB1$x$, and the second valid bits VB2$x$ may be implemented to include one bit.

In detail, the user data UD may include a series of user bits. Each of the user bits may have a first value (e.g., bit "1") or a second value (e.g., bit "0"). Some of the user bits may form the condition bits CBx, others of the user bits may form the first valid bits VB1$x$, and the others of the user bits may form the second valid bits VB2$x$.

In some embodiments, a way to distinguish the condition bits CBx, the first valid bits VB1$x$, and the second valid bits VB2$x$ from the user data UD may change depending on bit values of the condition bits CBx. This will be described in detail with reference to FIG. 6.

In a second operation ②, the conversion circuit 1121 may refer to a conversion rule corresponding to the condition bits CBx from among a plurality of conversion rules of the conversion table. The conversion table may store the plurality of conversion rules respectively corresponding to a plurality of condition bits. For example, the conversion table may store the conversion rule corresponding to the condition bits CBa, the conversion rule corresponding to the condition bits CBb, and the conversion rule corresponding to the condition bits CBx. The conversion rules may change depending on bit values of condition bits.

The conversion rule may refer to a method of generating the first intermediate data ID1 and the second intermediate data ID2 from the user data UD. For example, when the user data UD includes the condition bits CBx, the conversion rule may indicate a first bit range corresponding to the first valid bits VB1x of the user data UD and a second bit range corresponding to the second valid bits VB2x of the user data UD. The conversion rule may indicate first dummy bits DBx1 and second dummy bits DBx2 corresponding to the condition bits CBx.

For better understanding of embodiments of the present disclosure, the first dummy bits DBx1 and the second dummy bits DBx2 are described in the plural form; however, according to embodiments, the first dummy bits DBx1 may be implemented with one bit, or the second dummy bits DBx2 may be implemented with one bit.

In some embodiments, the conversion table may store the plurality of conversion rules satisfying a power limitation. For example, power values for transmission of the encoded data ED may change depending on bit values of the user data UD. With regard to all possible patterns of the bit values of the user data UD, the conversion rule may be determined such that the maximum power value for transmission of the encoded data ED is less than or equal to a power threshold value. The plurality of conversion rules satisfying the power limitation will be described in detail with reference to FIG. 6.

In a third operation ③, the conversion circuit 1121 may generate the first intermediate data ID1 and the second intermediate data ID2 based on the user data UD, in compliance with the conversion rule corresponding to the condition bits CBx. The first intermediate data ID1 may include the first dummy bits DBx1 and the first valid bits VB1x. The second intermediate data ID2 may include the second dummy bits DBx2 and the second valid bits VB2x. The conversion circuit 1121 may provide the first intermediate data ID1 to the first encoder 1122. The conversion circuit 1121 may provide the second intermediate data ID2 to the second encoder 1123.

Because the plurality of conversion rules of the conversion table satisfy the power limitation, a sum of a first power value corresponding to the first intermediate data ID1 and a second power value corresponding to the second intermediate data ID2 may be less than or equal to the power threshold value. The first power value may refer to a power value predicted for transmission of the first symbol data SD1 of the encoded data ED (or a power value calculated in advance when the conversion rule is determined). The second power value may refer to a power value predicted for transmission of the second symbol data SD2 of the encoded data ED.

In a fourth operation ④, the first encoder 1122 may receive the first intermediate data ID1 from the conversion circuit 1121. The first encoder 1122 may refer to the first translation table and may generate the first symbol data SD1 based on the first intermediate data ID1. The first encoder 1122 may provide the first symbol data SD1 to the serializer 1124.

The first translation table may store mapping relationships (e.g., translation rules) between the first intermediate data ID1 and the first symbol data SD1, with regard to all possible patterns according to bit values of the first intermediate data ID1. The first translation table will be described in detail with reference to FIG. 7.

In a fifth operation ⑤, the second encoder 1123 may receive the second intermediate data ID2 from the conversion circuit 1121. The second encoder 1123 may refer to the second translation table and may generate the second symbol data SD2 based on the second intermediate data ID2. The second encoder 1123 may provide the second symbol data SD2 to the serializer 1124.

The second translation table may store mapping relationships (e.g., translation rules) between the second intermediate data ID2 and the second symbol data SD2, with regard to all possible patterns according to bit values of the second intermediate data ID2.

In some embodiments, the second translation table may refer to the first translation table. For example, the number of bits of the second intermediate data ID2 may be greater than the number of bits of the first intermediate data ID1. The number of symbols (or bit patterns) of the second symbol data SD2 may be greater than the number of symbols of the first symbol data SD1. The translation rule of the second translation table may refer to the translation rule of the first translation table. The second translation table will be described in detail with reference to FIG. 8.

In a sixth operation ⑥, the serializer 1124 may receive the first symbol data SD1 from the first encoder 1122. The serializer 1124 may receive the second symbol data SD2 from the second encoder 1123. The serializer 1124 may generate the encoded data ED by serializing the first symbol data SD1 and the second symbol data SD2. The encoded data ED may include the first symbol data SD1 and the second symbol data SD2. The serializer 1124 may provide the encoded data ED to the transmitter 1130. The transmitter 1130 may provide the encoded data ED to the receiving circuit 1200.

Figure 3:
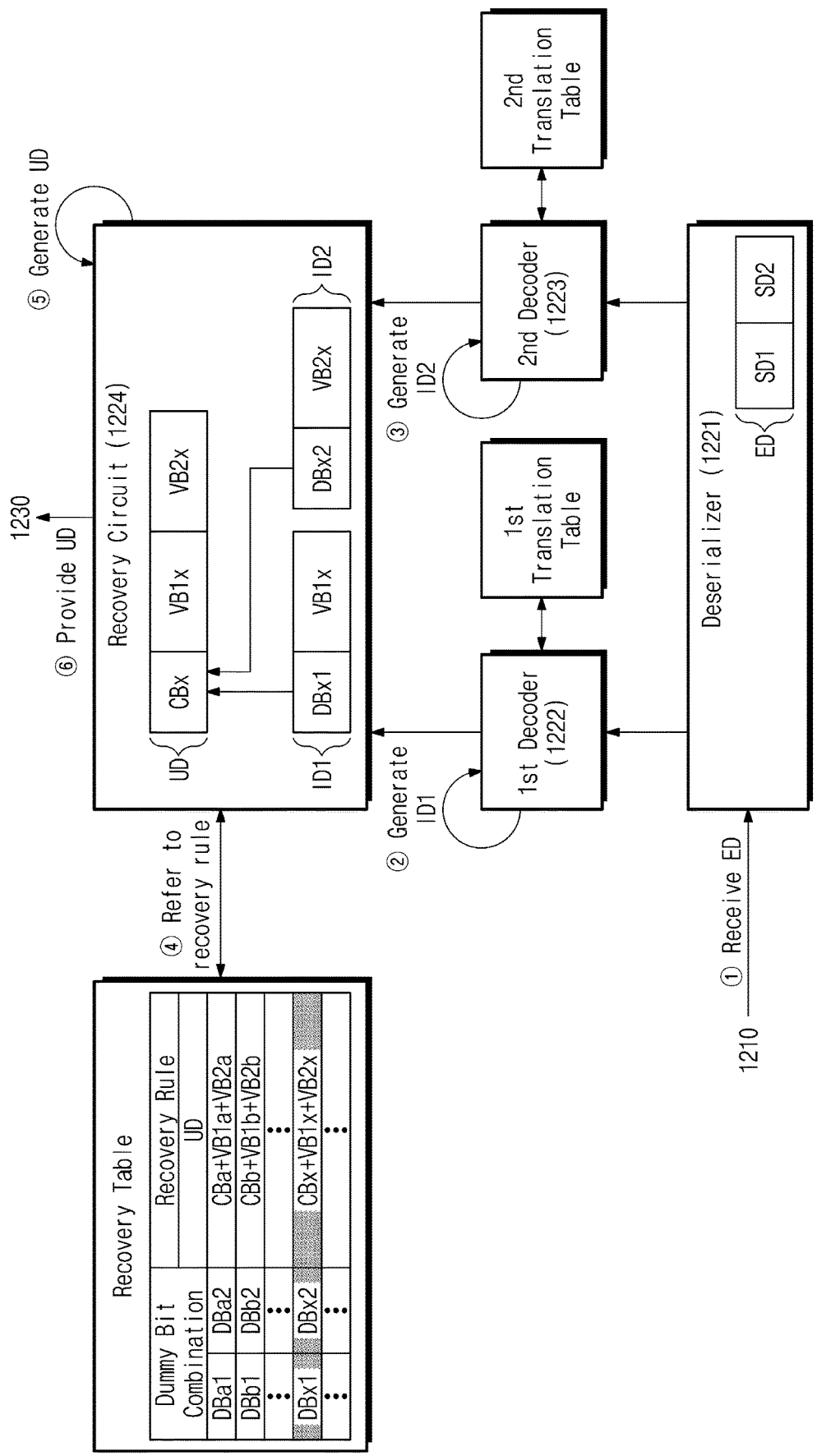
FIG. 3 is a diagram illustrating a method of operating a decoding circuit of FIG. 1, according to some embodiments of the present disclosure.

FIG. 3 is a diagram illustrating a method of operating a decoding circuit of FIG. 1, according to some embodiments of the present disclosure. Referring to FIGS. 1 and 3, the receiver 1210 may receive the encoded data ED from the transmitting circuit 1100. The decoding circuit 1220 may receive the encoded data ED from the receiver 1210. The decoding circuit 1220 may generate the user data UD based on the encoded data ED. The decoding circuit 1220 may provide the user data UD to the data queue 1230.

The decoding circuit 1220 may include a deserializer 1221, a first decoder 1222, a second decoder 1223, and a recovery circuit 1224. In some embodiments, the decoding circuit 1220 may further include a first translation table, a second translation table, and a recovery table. In some other embodiments, the decoding circuit 1220 may refer to the first translation table, the second translation table, and the recovery table implemented as external circuits of the receiving circuit 1200.

The deserializer 1221 may deserialize the encoded data ED to generate the first symbol data SD1 and the second symbol data SD2. For example, the deserializer 1221 may include a serial in parallel out (SIPO) block.

The first decoder 1222 may refer to the first translation table and may generate the first intermediate data ID1 based on the first symbol data SD1. The first translation table of FIG. 3 may be implemented to be similar to the first translation table of FIG. 2. The first decoder 1222 and the first translation table may be separate circuits, modules, or blocks or may be implemented with one integrated circuit, module, or block. For example, the first decoder 1222 and the first translation table may be implemented by instructions stored in a computer readable medium or may be implemented with logic circuits.

The second decoder 1223 may refer to the second translation table and may generate the second intermediate data ID2 based on the second symbol data SD2. The second translation table of FIG. 3 may be implemented to be similar to the second translation table of FIG. 2. The second decoder 1223 and the second translation table may be separate circuits, modules, or blocks or may be implemented with one integrated circuit, module, or block. For example, the second decoder 1223 and the first translation table may be implemented by instructions stored in a computer readable medium or may be implemented with logic circuits.

The recovery circuit 1224 may refer to the recovery table and may generate the user data UD based on the first intermediate data ID1 and the second intermediate data ID2. The recovery circuit 1224 and the recovery table may be separate circuits, modules, or blocks or may be implemented with one integrated circuit, module, or block. For example, the recovery circuit 1224 and the recovery table may be implemented by instructions stored in a computer readable medium or may be implemented with logic circuits.

Below, the method of operating the decoding circuit 1220 will be described in detail with reference to FIG. 3.

In a first operation ①, the deserializer 1221 may receive the encoded data ED from the receiver 1210. The deserializer 1221 may deserialize the encoded data ED to generate the first symbol data SD1 and the second symbol data SD2. The deserializer 1221 may provide the first symbol data SD1 to the first decoder 1222. The deserializer 1221 may provide the second symbol data SD2 to the second decoder 1223.

In a second operation ②, the first decoder 1222 may receive the first symbol data SD1 from the deserializer 1221. The first decoder 1222 may refer to the first translation table and may generate the first intermediate data ID1 based on the first symbol data SD1. The first decoder 1222 may provide the first intermediate data ID1 to the recovery circuit 1224.

In a third operation ③, the second decoder 1223 may receive the second symbol data SD2 from the deserializer 1221. The second decoder 1223 may refer to the second translation table and may generate the second intermediate data ID2 based on the second symbol data SD2. The second decoder 1223 may provide the second intermediate data ID2 to the recovery circuit 1224.

In a fourth operation ④, the recovery circuit 1224 may receive the first intermediate data ID1 from the first decoder 1222. The first intermediate data ID1 may include the first dummy bits DBx1 and the first valid bits VB1x. The recovery circuit 1224 may receive the second intermediate data ID2 from the second decoder 1223. The second intermediate data ID2 may include the second dummy bits DBx2 and the second valid bits VB2x. The recovery circuit 1224 may refer to a recovery rule corresponding to a dummy bit combination of the first dummy bits DBx1 and the second dummy bits DBx2 from among a plurality of recovery rules of the recovery table.

The recovery table may store the plurality of recovery rules respectively corresponding to a plurality of dummy bit combinations. For example, the recovery table may store a recovery rule corresponding to a dummy bit combination of the first dummy bits DBa1 and the second dummy bits DBa2, a recovery rule corresponding to a dummy bit combination of the first dummy bits DBb1 and the second dummy bits DBb2, and a recovery rule corresponding to a dummy bit combination of the first dummy bits DBx1 and the second dummy bits DBx2. A recovery rule may change depending on bit values of the first dummy bits and bit values of the second dummy bits.

The recovery rule may be used to generate the user data UD from a combination of the first intermediate data ID1 and the second intermediate data ID2. For example, when the first intermediate data ID1 include the first dummy bits DBx1 and the second intermediate data ID2 include the second dummy bits DBx2, the recovery rule may indicate a first bit range corresponding to the first valid bits VB1x of the first intermediate data ID1 and a second bit range corresponding to the second valid bits VB2x of the second intermediate data ID2. The recovery rule may indicate the condition bits CBx corresponding to a dummy bit combination of the first dummy bits DBx1 and the second dummy bits DBx2.

The recovery rules of the recovery table may indicate inverse-conversion for the conversion rules of the conversion table of FIG. 2. For example, the plurality of recovery rules of the recovery table may respectively correspond to the plurality of conversion rules of the conversion table of FIG. 2.

In a fifth operation ⑤, the recovery circuit 1224 may generate the user data UD based on the first intermediate data ID1 and the second intermediate data ID2, in compliance with the recovery rule corresponding to a dummy bit combination of the first dummy bits DBx1 and the second dummy bits DBx2. The user data UD may include the condition bits CBx, the first valid bits VB1x, and the second valid bits VB2x.

In a sixth operation ⑥, the recovery circuit 1224 may provide the user data UD to the data queue 1230. The content (e.g., a series of bit values) of the user data UD provided to the data queue 1230 may be the same as the content of the user data UD stored in the data queue 1110 of FIG. 1.

Figure 4:
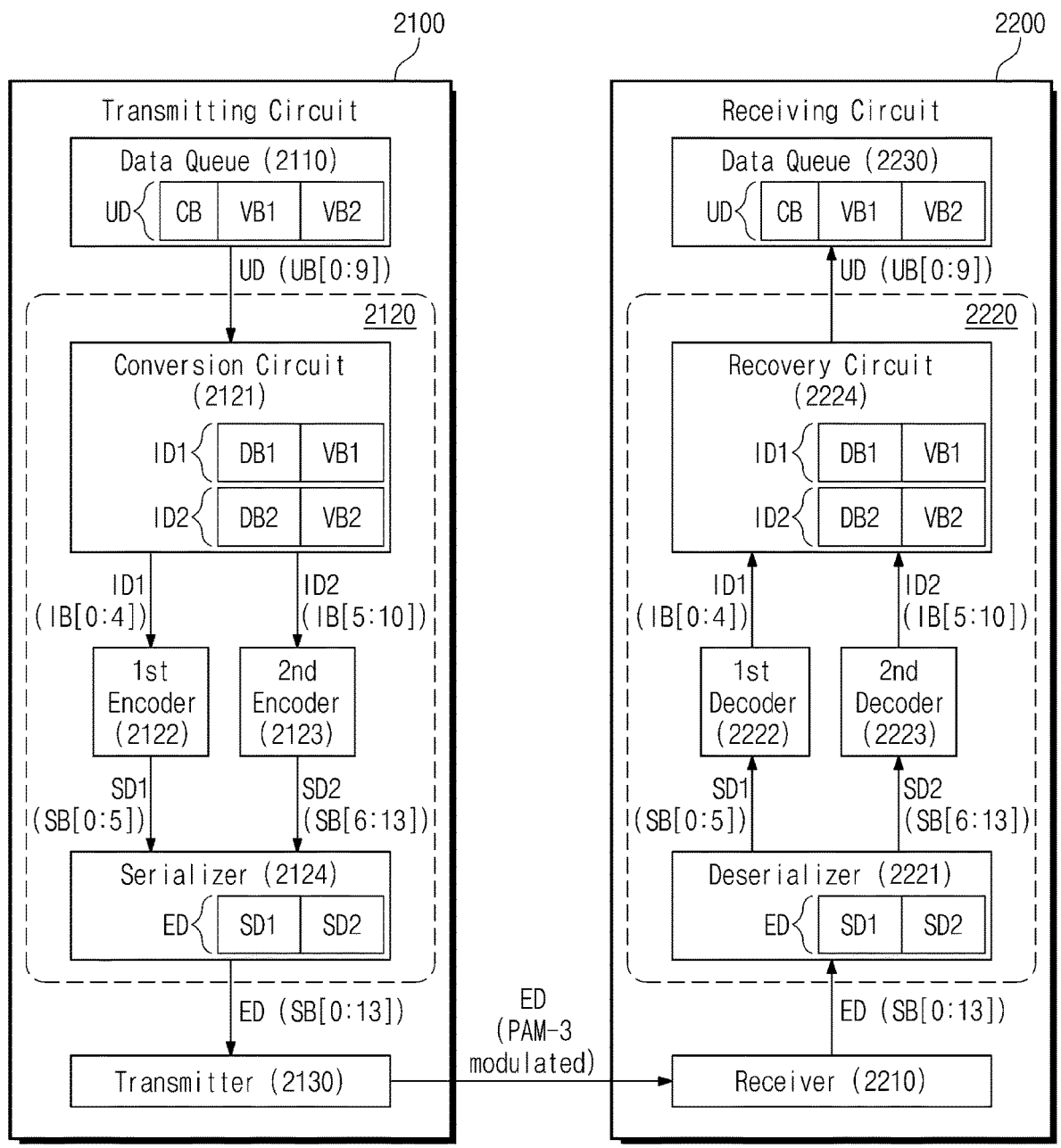
FIG. 4 is a block diagram of an electronic system according to some embodiments of the present disclosure.

FIG. 4 is a block diagram of an electronic system according to some embodiments of the present disclosure. Referring to FIG. 4, an electronic system 2000 may support PAM-3 encoding. According to the low-power PAM-3 encoding scheme, the electronic system 2000 may generate the encoded data ED having a size of 14 bits, based on the user data UD having a size of 10 bits.

The electronic system 2000 may include a transmitting circuit 2100 and a receiving circuit 2200. The transmitting circuit 2100 may include a data queue 2110, an encoding circuit 2120, and a transmitter 2130. The encoding circuit 2120 may include a conversion circuit 2121, a first encoder 2122, a second encoder 2123, and a serializer 2124. The receiving circuit 2200 may include a receiver 2210, a decoding circuit 2220, and a data queue 2230. The decoding circuit 2220 may include a deserializer 2221, a first decoder 2222, a second decoder 2223, and a recovery circuit 2224.

The data queue 2110 may store the user data UD. The user data UD may have a size of 10 bits. For example, the user data UD may include user bits UB[0:9]. Some of the user bits UB[0:9] may be referred to as "condition bits CB", others of the user bits UB[0:9] may be referred to as "first valid bits VB1", and the others of the user bits UB[0:9] may be referred to as "second valid bits VB2". The data queue 2110 may provide the user data UD to the conversion circuit 2121.

The conversion circuit 2121 may refer to a conversion rule corresponding to the condition bits CB and may generate the first intermediate data ID1 and the second intermediate data ID2 based on the user data UD. The conversion circuit 2121 may provide the first intermediate data ID1 to the first encoder 2122. The conversion circuit 2121 may provide the second intermediate data ID2 to the second encoder 2123.

The first intermediate data ID1 may have a size of 5 bits. For example, the first intermediate data ID1 may include intermediate bits IB[0:4]. Some of the intermediate bits IB[0:4] may be referred to as "first dummy bits DB1", and the others of the intermediate bits IB[0:4] may be referred to as "first valid bits VB1".

The second intermediate data ID2 may have a size of 6 bits. For example, the second intermediate data ID2 may include intermediate bits IB[5:10]. Some of the intermediate bits IB[5:10] may be referred to as "second dummy bits DB2", and the others of the intermediate bits IB[5:10] may be referred to as "second valid bits VB2".

The first encoder 2122 may generate the first symbol data SD1 by performing first encoding on the first intermediate data ID1. The first encoder 2122 may provide the first symbol data SD1 to the serializer 2124. The first symbol data SD1 may have a size of 6 bits. For example, the first symbol data SD1 may include symbol bits SB[0:5]. The symbol bits SB[0:1] may be referred to as a "first symbol", the symbol bits SB[2:3] may be referred to as a "second symbol", and the symbol bits SB[4:5] may be referred to as a "third symbol".

The second encoder 2123 may generate the second symbol data SD2 by performing second encoding on the second intermediate data ID2. The second encoder 2123 may provide the second symbol data SD2 to the serializer 2124. The second symbol data SD2 may have a size of 8 bits. For example, the second symbol data SD2 may include symbol bits SB[6:13]. The symbol bits SB[6:7] may be referred to as a "fourth symbol", the symbol bits SB[8:9] may be referred to as a "fifth symbol", the symbol bits SB[10:11] may be referred to as a "sixth symbol", and the symbol bits SB[12:13] may be referred to as a "seventh symbol".

The serializer 2124 may generate the encoded data ED by serializing the first symbol data SD1 and the second symbol data SD2. The serializer 2124 may provide the encoded data ED to the transmitter 2130. The encoded data ED may have a size of 14 bits. For example, the encoded data ED may include symbol bits SB[0:13].

The encoded data ED may correspond to a signal generated according to the low-power PAM-3 encoding. For example, the encoded data ED may include first to seventh symbols. Each of the first to seventh symbols may have one of three symbol values. In the encoded data ED, the frequency at which a symbol value corresponding to a high power value is generated may be low.

The transmitter 2130 may provide the encoded data ED to the receiver 2210. The receiver 2210 may receive the encoded data ED from the transmitter 2130. The receiver 2210 may provide the encoded data ED to the deserializer 2221.

The deserializer 2221 may deserialize the encoded data ED to generate the first symbol data SD1 and the second symbol data SD2. The deserializer 2221 may provide the first symbol data SD1 to the first decoder 2222. The deserializer 2221 may provide the second symbol data SD2 to the second decoder 2223.

The first decoder 2222 may generate the first intermediate data ID1 by performing first decoding on the first symbol data SD1. The first decoder 2222 may provide the first intermediate data ID1 to the recovery circuit 2224. The first intermediate data ID1 may include the first dummy bits DB1 and the first valid bits VB1.

The second decoder 2223 may generate the second intermediate data ID2 by performing second decoding on the second symbol data SD2. The second decoder 2223 may provide the second intermediate data ID2 to the recovery circuit 2224. The second intermediate data ID2 may include the second dummy bits DB2 and the second valid bits VB2.

The recovery circuit 2224 may refer to a recovery rule corresponding to a dummy bit combination of the first dummy bits DB1 and the second dummy bits DB2 and may generate the user data UD based on the first intermediate data ID1 and the second intermediate data ID2. The recovery circuit 2224 may provide the user data UD to the data queue 2230.

The data queue 2230 may store the user data UD received from the recovery circuit 2224. The content of the user data UD of the data queue 2230 may be the same as the content of the user data UD of the data queue 2110. That is, the electronic system 2000 may transmit data from the transmitting circuit 2100 to the receiving circuit 2200 without reliability loss while minimizing power consumption for data transmission.

Figure 5:
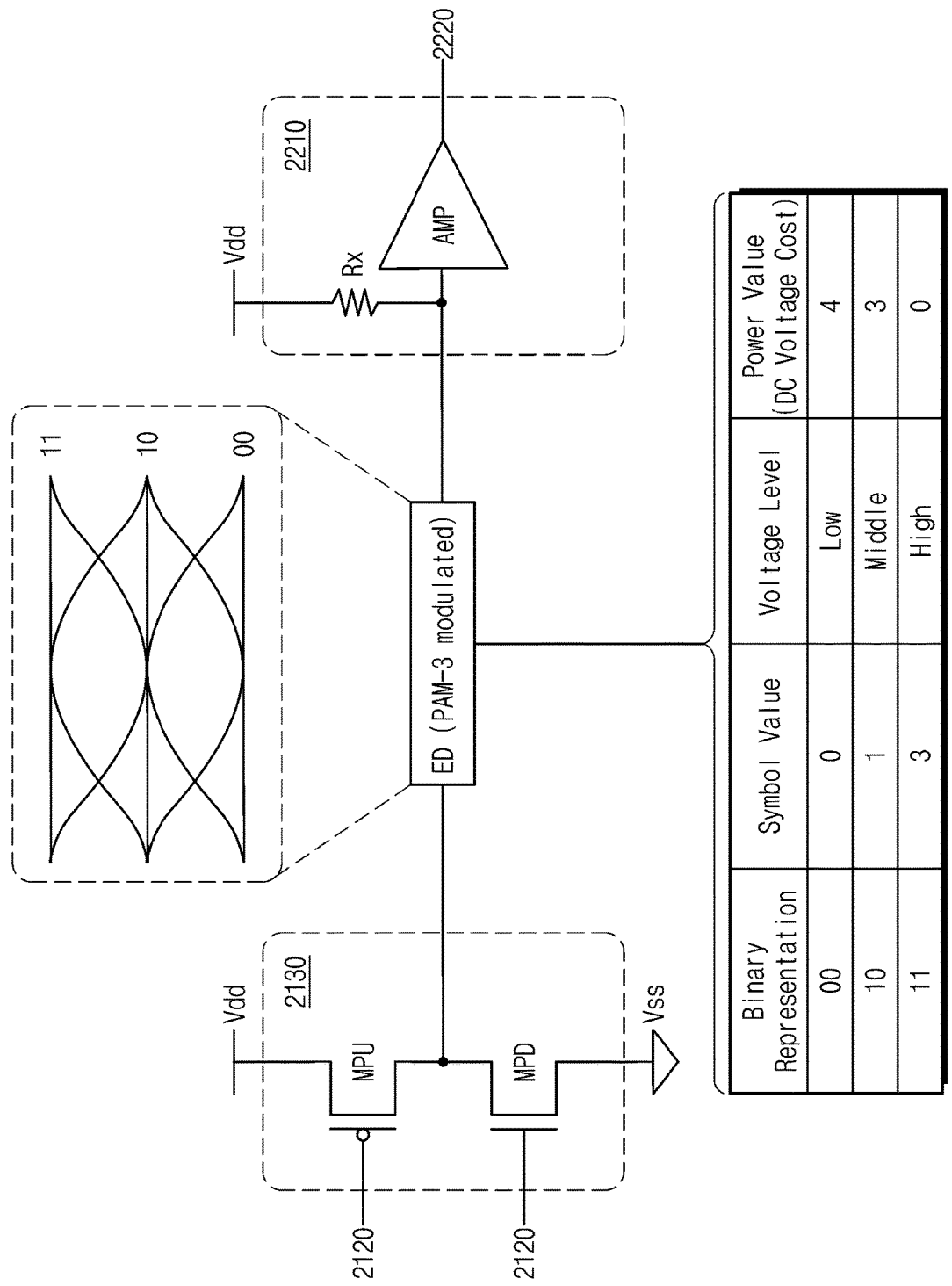
FIG. 5 is a diagram illustrating encoded data of an electronic system according to some embodiments of the present disclosure.

FIG. 5 is a diagram illustrating encoded data of an electronic system according to some embodiments of the present disclosure. Referring to FIGS. 4 and 5, the electronic system 2000 may support PAM-3 encoding. The electronic system 2000 may include the transmitter 2130 and the receiver 2210. The transmitter 2130 may be configured to output the encoded data ED to the receiver 2210 under control of the encoding circuit 2120. The receiver 2210 may be configured to receive the encoded data ED from the transmitter 2130. The receiver 2210 may be configured to provide the encoded data ED to the decoding circuit 2220.

The transmitter 2130 may include a pull-up transistor MPU and a pull-down transistor MPD. The pull-up transistor MPU may be connected between a power node receiving a power supply voltage Vdd and a transmitting node from which the encoded data ED are output. The pull-down transistor MPD may be connected between the transmitting node from which the encoded data ED are output and the power node receiving a power supply voltage Vss. The power supply voltage Vdd may be higher than the power supply voltage Vss. The power supply voltage Vss may be also referred to as a "ground voltage".

The encoding circuit 2120 may be configured to adjust a voltage level of the transmitting node by selectively activating one of the pull-up transistor MPU and the pull-down transistor MPD. For example, to transmit a symbol bit having a first value (e.g., bit "1"), the encoding circuit 2120 may turn on the pull-up transistor MPU and may turn off the pull-down transistor MPD. To transmit a symbol bit having a second value (e.g., bit "0"), the encoding circuit 2120 may turn off the pull-up transistor MPU and may turn on the pull-down transistor MPD.

The receiver 2210 may include a receiving resistor Rx and an amplifier AMP. The receiving resistor Rx may be connected between the power node receiving the power supply voltage Vdd and a receiving node receiving the encoded data ED. An input terminal of the amplifier AMP may be connected to the receiving node. An output terminal of the amplifier AMP may be connected to the decoding circuit 2220. That is, the input terminal of the amplifier AMP may receive the power supply voltage Vdd through the receiving resistor Rx. The receiver 2210 may be terminated by the power supply voltage Vdd.

Under control of the encoding circuit 2120, the transmitter 2130 may be configured to generate the encoded data ED and may provide the encoded data ED to the receiver 2210. The encoded data ED may include a series of a plurality of symbols. Each of the plurality of symbols may have a first symbol value, a second symbol value, or a third symbol value.

Binary representation of the first symbol value may be "00". The first symbol value may be referred to as "0". The first symbol value may have a low voltage level corresponding to the power supply voltage Vss. Because the receiver 2210 is terminated by the power supply voltage Vdd, a voltage level difference across the receiving resistor Rx may be great when the low voltage level is transmitted; in this case, power consumption may be great. A power value corresponding to the first symbol value may be "4". The power value may indicate a DC voltage cost for transmitting a symbol (e.g., power consumption by the receiving resistor Rx).

Binary representation of the second symbol value may be "10". The second symbol value may be referred to as "1". The second symbol value may have an intermediate voltage level. The intermediate voltage level may correspond to a voltage between the power supply voltage Vdd and the power supply voltage Vss. A power value corresponding to the second symbol value may be "3".

Binary representation of the third symbol value may be "11". The third symbol value may be referred to as "3". The third symbol value may have a high voltage level corresponding to the power supply voltage Vdd. A power value corresponding to the third symbol value may be "0". Because the receiver 2210 is terminated by the power supply voltage Vdd, a voltage difference across the receiving resistor Rx may not exist when the high voltage level is transmitted; in this case, a power value of the third symbol value may be "0". That is, the first power value corresponding to the first symbol may be higher than or greater than a second power value corresponding to the second symbol, which is higher than or greater than a third power value corresponding to a third symbol.

An example of a voltage level measured between the transmitter 2130 and the receiver 2210 will be described with reference to a waveform of the eye diagram of the encoded data ED. An each of the symbols of the encoded data ED may have a low voltage level corresponding to binary representation "00", a middle voltage level corresponding to binary representation "10", a high voltage level corresponding to binary representation "11".

In some embodiments, the encoding circuit 2120 may be configured to generate the encoded data ED in compliance with the low-power PAM-3 encoding. For example, the encoding circuit 2120 may generate the encoded data ED such that the frequency of occurrence of the first symbol value is low and the frequency of occurrence of the second and third symbol values is high. Power consumption for transmission of the encoded data ED may be reduced by minimizing transmission of the first symbol value whose power value is "4".

Figure 6:
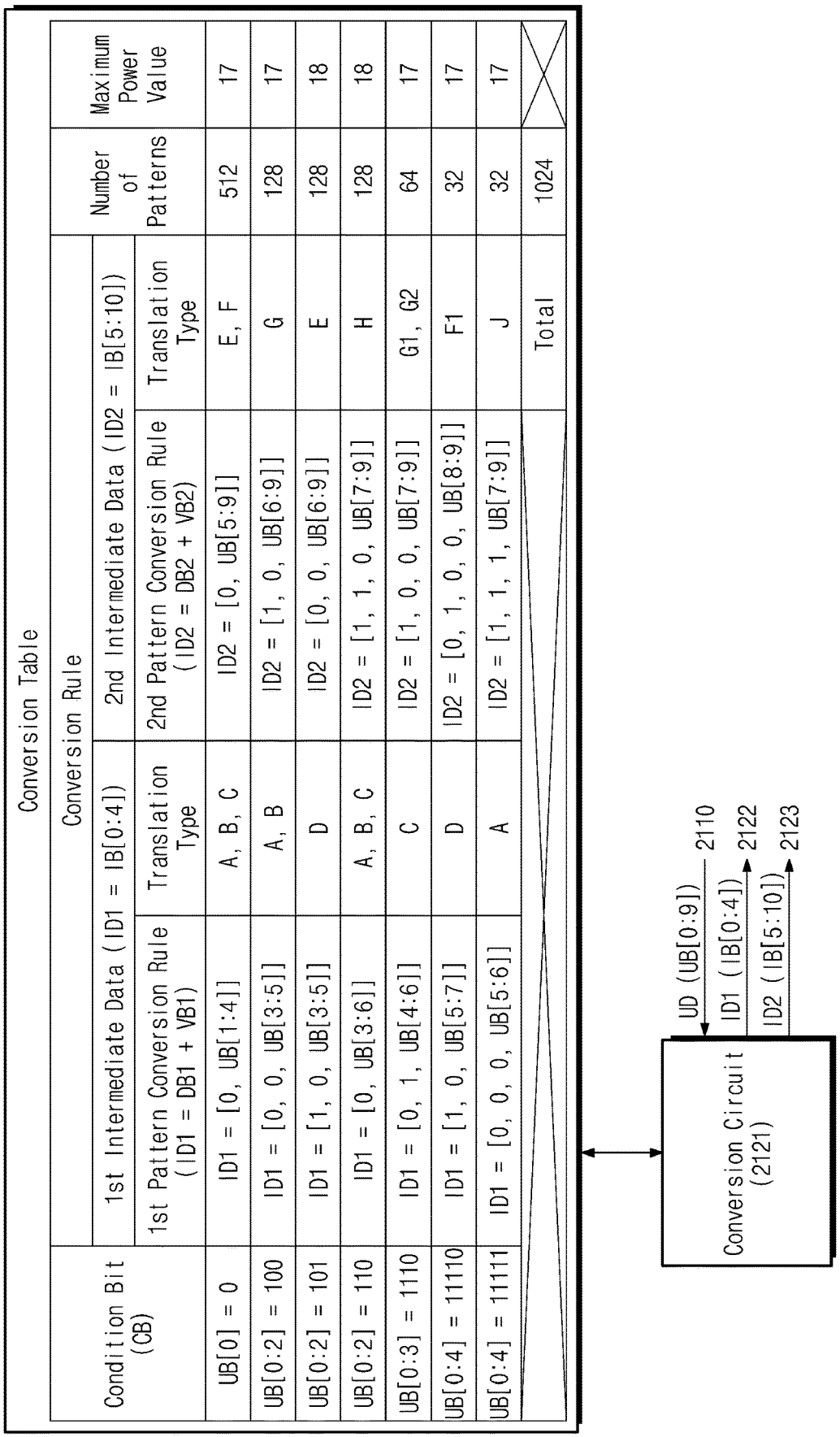
FIG. 6 is a diagram illustrating a conversion table according to some embodiments of the present disclosure.

FIG. 6 is a diagram illustrating a conversion table according to some embodiments of the present disclosure. Referring to FIGS. 4 and 6, the conversion table may include conversion rules complying with the low-power PAM-3 encoding. The conversion circuit 2121 may be configured to receive the user data UD from the data queue 2110. The user data UD may include the user bits UB[0:9]. The conversion circuit 2121 may refer to a conversion rule of the conversion table and may generate the first intermediate data ID1 and the second intermediate data ID2 based on the user data UD. The conversion rule may include a first pattern conversion rule for generating the first intermediate data ID1 and a second pattern conversion rule for generating the second intermediate data ID2.

According to the first pattern conversion rule, the first intermediate data ID1 may include the intermediate bits IB[0:4]. Some of the intermediate bits IB[0:4] may be the first dummy bit DB1, and the others of the intermediate bits IB[0:4] may be the first valid bits VB1.

According to the second pattern conversion rule, the second intermediate data ID2 may include the intermediate bits IB[5:10]. Some of the intermediate bits IB[5:10] may be the second dummy bit DB2, and the others of the intermediate bits IB[5:10] may be the second valid bits VB2.

The conversion circuit 2121 may be configured to provide the first intermediate data ID1 to the first encoder 2122. The conversion circuit 2121 may be configured to provide the second intermediate data ID2 to the second encoder 2123.

The conversion table may be configured to store a plurality of conversion rules corresponding to a plurality of condition bits. The user data UD may include the user bits UB[0:9]. Because the number of user bits UB[0:9] is "10", the number of possible patterns may be $2^{10}$ (i.e., 1024). The conversion table describes conversion rules with regard to all cases capable of being generated depending on bit values of the user data UD. The conversion rules may change depending on bit values of the condition bit CB. A maximum power value capable of being drawn from each conversion rule may be less than or equal to a power threshold value. For example, the power threshold value may be "18".

When the user bit UB[0] corresponding to the condition bit CB is "0", the intermediate bits IB[0:4] may include bit "0" and the user bits UB[1:4] sequentially. The first dummy bit DB1 may be bit "0". The first valid bits VB1 may be the user bits UB[1:4]. A translation type of the first intermediate data ID1 may be "A", "B", or "C". The translation type of the first intermediate data ID1 will be described in detail with reference to FIG. 7. The intermediate bits IB[5:10] may include bit "0" and the user bits UB[5:9]. The second dummy bit DB2 may be bit "0". The second valid bits VB2 may be the user bits UB[5:9]. A translation type of the second intermediate data ID2 may be "E" or "F". The number of possible patterns may be "512". The maximum power value may be "17".

When the user bits UB[0:2] corresponding to the condition bit CB is "100", the intermediate bits IB[0:4] may include bit "0", bit "0", and the user bits UB[3:5] sequentially. A translation type of the first intermediate data ID1 may be "A" or "B". The intermediate bits IB[5:10] may include bit "1", bit "0", and the user bits UB[6:9]. A translation type of the second intermediate data ID2 may be "G". The number of possible patterns may be "128". The maximum power value may be "17".

When the user bits UB[0:2] corresponding to the condition bit CB is "101", the intermediate bits IB[0:4] may include bit "0", bit "0", and the user bits UB[3:5] sequentially. A translation type of the first intermediate data ID1 may be "D". The intermediate bits IB[5:10] may include bit "0", bit "0", and the user bits UB[6:9]. A translation type of the second intermediate data ID2 may be "E". The number of possible patterns may be "128". The maximum power value may be "18".

When the user bits UB[0:2] corresponding to the condition bit CB is "110", the intermediate bits IB[0:4] may include bit "0" and the user bits UB[3:6] sequentially. A translation type of the first intermediate data ID1 may be "A", "B", or "C". The intermediate bits IB[5:10] may include bit "1", bit "1", bit "0", and the user bits UB[7:9] sequentially. A translation type of the second intermediate data ID2 may be "H". The number of possible patterns may be "128". The maximum power value may be "18".

When the user bits UB[0:3] corresponding to the condition bit CB is "1110", the intermediate bits IB[0:4] may include bit "0", bit "1", and the user bits UB[4:6] sequentially. A translation type of the first intermediate data ID1 may be "C". The intermediate bits IB[5:10] may include bit "1", bit "0", bit "0", and the user bits UB[7:9] sequentially. A translation type of the second intermediate data ID2 may be "G1" or "G2". The number of possible patterns may be "64". The maximum power value may be "17".

When the user bits UB[0:4] corresponding to the condition bit CB is "11110", the intermediate bits IB[0:4] may include bit "1", bit "0", and the user bits UB[5:7] sequentially. A translation type of the first intermediate data ID1 may be "D". The intermediate bits IB[5:10] may include bit "0", bit "1", bit "0", bit "0", and the user bits UB[8:9] sequentially. A translation type of the second intermediate data ID2 may be "F1". The number of possible patterns may be "32". The maximum power value may be "17".

When the user bits UB[0:4] corresponding to the condition bit CB is "11111", the intermediate bits IB[0:4] may include bit "0", bit "0", bit "0", and the user bits UB[5:6] sequentially. A translation type of the first intermediate data ID1 may be "A". The intermediate bits IB[5:10] may include bit "1", bit "1", bit "1", and the user bits UB[7:9] sequentially. A translation type of the second intermediate data ID2 may be "J". The number of possible patterns may be "32". The maximum power value may be "17".

In some embodiments, the number of condition bits CB may change depending on a bit value of a most significant bit (MSB) of the user data UD. For example, the MSB of the user data UD may be the user bit UB[0]. When the bit value of the user bit UB[0] is "0", the number of condition bits CB may be "1". When the bit value of the user bit UB[0] is "1", the number of condition bits CB may be one or more.

FIG. 7 is a diagram illustrating a first translation table according to some embodiments of the present disclosure. Referring to FIGS. 4 and 7, the first translation table may include translation rules for first encoding of the first encoder 2122 and first decoding of the first decoder 2222. The translation rules of the first translation table may define mapping relationships between the first intermediate data ID1 and the first symbol data SD1. The first intermediate data ID1 may include the intermediate bits IB[0:4]. The first symbol data SD1 may include the symbol bits SB[0:5]. The symbol bits SB[0:1] may be referred to as a "first symbol SY1". The symbol bits SB[2:3] may be referred to as a "second symbol SY2". The symbol bits SB[4:5] may be referred to as a "third symbol SY3". In the conversion rules of FIG. 6, because there is no case where the intermediate bits IB[0:1] are "11", the intermediate bits IB[0:4] may have one of 24 bit patterns (i.e., "11000", "11001", "11010", "11011", "11100", "11101", "11110", and "11111" among 32 bit patterns are omitted). The first translation table describes translation rules for 24 bit patterns.

When the intermediate bits IB[0:2] are "000", the translation rules may be referred to as "translation type A". In translation type "A", a power value consumed to transmit the first symbol data SD1 may be between "0" and "3". For example, when the intermediate bits IB[0:4] are "00000", symbol values of the first, second, and third symbols SY1, SY2, and SY3 may be "3", "1", and "3", respectively. In the table of FIG. 5, a symbol value of "3" may correspond to a power value of "0", and a symbol value of "1" may correspond to a power value of "3". A power value for transmitting the entire first, second, and third symbols SY1, SY2, and SY3 may be "3". As in the above description, when the intermediate bits IB[0:4] are "00001", a power value may be "3". When the intermediate bits IB[0:4] are "00010", a power value may be "0". When the intermediate bits IB[0:4] are "00011", a power value may be "3". That is, in translation type "A", a range of a power value capable of being consumed may be between "0" and "3".

When the intermediate bits IB[0:2] are "001", the translation rules may be referred to as "translation type B". In translation type "B", a power value consumed to transmit the first symbol data SD1 may be between "4" and "6".

When the intermediate bits IB[0:1] are "01", the translation rules may be referred to as "translation type C". In translation type "C", a power value consumed to transmit the first symbol data SD1 may be between "6" and "7".

When the intermediate bits IB[0:1] are "10", the translation rules may be referred to as "translation type D". In translation type "D", a power value consumed to transmit the first symbol data SD1 may be between "8" and "11".

FIG. 8 is a diagram illustrating a second translation table according to some embodiments of the present disclosure. Referring to FIGS. 4 and 8, the second translation table may include translation rules for second encoding of the second encoder 2123 and second decoding of the second decoder 2223. The translation rules of the second translation table may define mapping relationships between the second intermediate data ID2 and the second symbol data SD2. The second intermediate data ID2 may include the intermediate bits IB[5:10]. The second symbol data SD2 may include the symbol bits SB[6:13]. The symbol bits SB[6:7] may be referred to as a "fourth symbol SY4". The symbol bits SB[8:9] may be referred to as a "fifth symbol SY5". The symbol bits SB[10:11] may be referred to as a "sixth symbol SY6". The symbol bits SB[12:13] may be referred to as a "seventh symbol SY7".

The translation rule of the second translation table may refer to the translation rule of the first translation table. For example, the fourth symbol SY4 may be determined based on the intermediate bit IB[5]. The fifth, sixth, and seventh symbols SY5, SY6, and SY7 may be determined based on the intermediate bits IB[6:10]. In the second translation table, mapping relationships between the fifth, sixth, and seventh symbols SY5, SY6, and SY7 and the intermediate bits IB[6:10] may be similar to the mapping relationships between the first, second, and third symbols SY1, SY2, and SY3 and the intermediate bits IB[0:5] of the first translation table.

When the intermediate bits IB[5:10] are "reserved", the intermediate bits IB[6:7] may be "11". For example, because the case where the intermediate bits IB[0:1] are "11" does not exist in FIG. 6, the case where the intermediate bits IB[0:1] are "11" may fail to exist in FIG. 7, and thus, the first intermediate data ID1 may have one of 24 bit patterns. In contrast, the case where the intermediate bits IB[6:7] are "11" may exist in FIG. 6. Accordingly, even though the number of bit patterns of the first translation table of FIG. 7 is doubled, it may be difficult to define translation rules for all the bit patterns of the second intermediate data ID2. Accordingly, in the intermediate bits IB[5:10] marked by "reserved", mapping relationships between the second intermediate data ID2 and the second symbol data SD2 for the case where the intermediate bits IB[6:7] are "11" may be defined.

When the intermediate bits IB[5:8] are "0001", a symbol value of the fourth symbol SY4 value may be "3". The fifth, sixth, and seventh symbols SY5, SY6, and SY7 may be obtained to be similar to the translation rule of translation type "B". In this case, the translation rules may be referred to as "translation type E2". When the intermediate bits IB[5:7] are "001", a symbol value of the fourth symbol SY4 value may be "3". The fifth, sixth, and seventh symbols SY5, SY6, and SY7 may be obtained to be similar to the translation rule of translation type "C". In this case, the translation rules may be referred to as "translation type E3". Translation type "E" may include translation type "E2" and translation type "E3". In translation type "E", a power value consumed to transmit the second symbol data SD2 may be between "0" and "7".

When the intermediate bits IB[5:8] are "0000", a symbol value of the fourth symbol SY4 value may be "1". The fifth, sixth, and seventh symbols SY5, SY6, and SY7 may be obtained to be similar to the translation rule of translation type "A". In this case, the translation rules may be referred to as "translation type F1". When the intermediate bits IB[5:7] are "101", a symbol value of the fourth symbol SY4 value may be "1". The fifth, sixth, and seventh symbols SY5, SY6, and SY7 may be obtained to be similar to the translation rule of translation type "C". In this case, the translation rules may be referred to as "translation type F3". Translation type "F" may include translation type "F1" and translation type "F3". In translation type "F", a power value consumed to transmit the second symbol data SD2 may be between "3" and "10".

When the intermediate bits IB[5:8] are "1000", a symbol value of the fourth symbol SY4 value may be "0". The fifth, sixth, and seventh symbols SY5, SY6, and SY7 may be obtained to be similar to the translation rule of translation type "A". In this case, the translation rules may be referred to as "translation type G1". When the intermediate bits IB[5:8] are "1001", a symbol value of the fourth symbol SY4 value may be "0". The fifth, sixth, and seventh symbols SY5, SY6, and SY7 may be obtained to be similar to the translation rule of translation type "B". In this case, the translation rules may be referred to as "translation type G2". Translation type "G" may include translation type "G1" and translation type "G2". In translation type "G", a power value consumed to transmit the second symbol data SD2 may be between "4" and "11".

When the intermediate bits IB[5:7] are "010", a symbol value of the fourth symbol SY4 value may be "3". The fifth, sixth, and seventh symbols SY5, SY6, and SY7 may be obtained to be similar to the translation rule of translation type "D". In this case, the translation rules may be referred to as "translation type H". In translation type "H", a power value consumed to transmit the second symbol data SD2 may be between "8" and "11".

When the intermediate bits IB[5:7] are "110", a symbol value of the fourth symbol SY4 value may be "1". The fifth, sixth, and seventh symbols SY5, SY6, and SY7 may be obtained to be similar to the translation rule of translation type "D". In this case, the translation rules may be referred to as "translation type J". In translation type "J", a power value consumed to transmit the second symbol data SD2 may be between "11" and "14".

Figure 9:
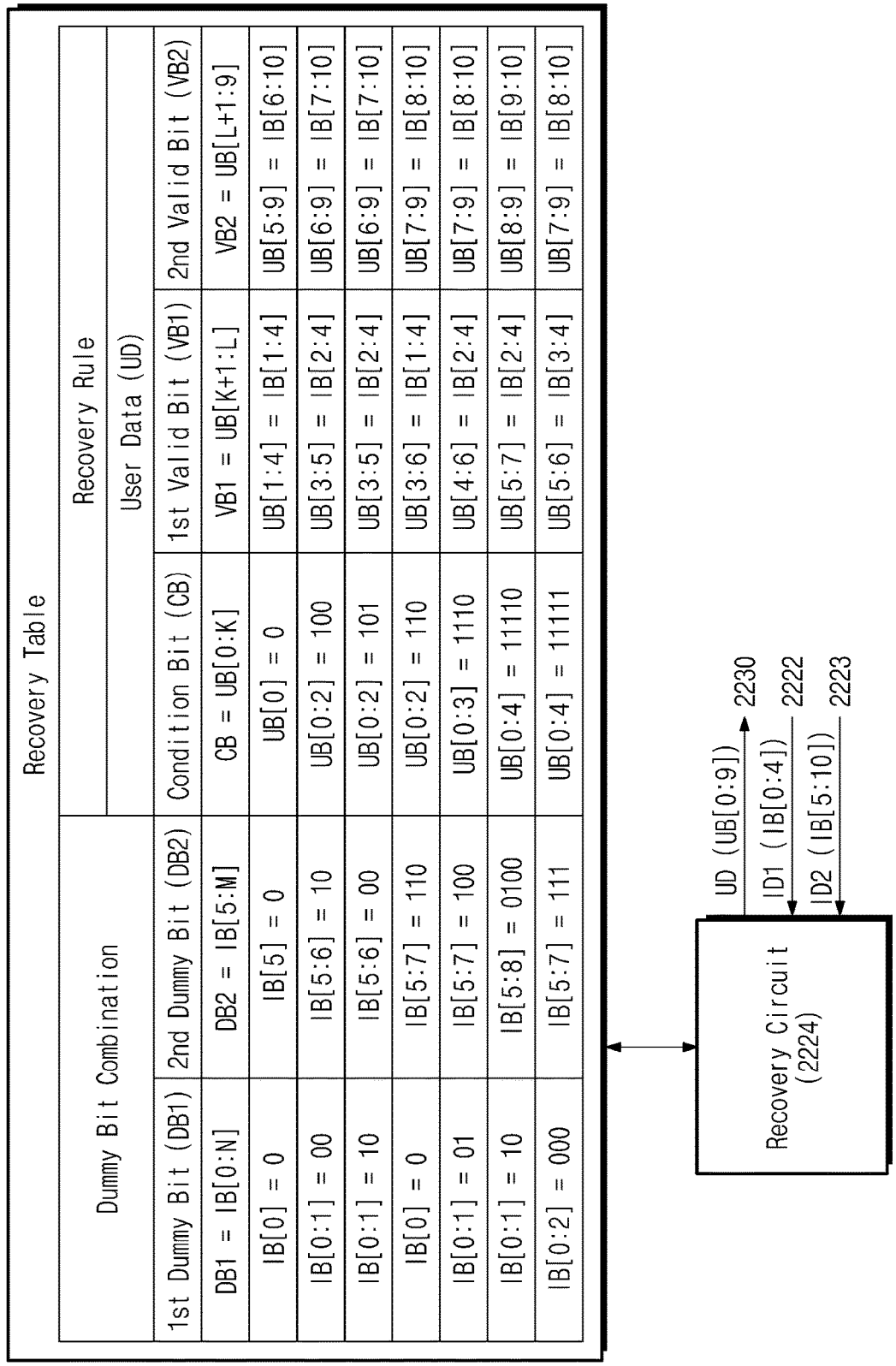
FIG. 9 is a diagram illustrating a recovery table according to some embodiments of the present disclosure.

FIG. 9 is a diagram illustrating a recovery table according to some embodiments of the present disclosure. Referring to FIGS. 4 and 9, the recovery table may include recovery rules complying with the low-power PAM-3 decoding. The recovery circuit 2224 may be configured to receive the first intermediate data ID1 from the first decoder 2222. The first intermediate data ID1 may include the intermediate bits IB[0:4]. The intermediate bits IB[0:N] may be referred to as a "first dummy bit DB1". Herein, "N" may be a natural number less than 4. The recovery circuit 2224 may be configured to receive the second intermediate data ID2 from the second decoder 2223. The second intermediate data ID2 may include the intermediate bits IB[5:10]. The intermediate bits IB[5:M] may be referred to as a "second dummy bit DB2". Herein, "M" may be a natural number greater than or equal to 5 and less than 10.

The recovery circuit 2224 may refer to the recovery rule of the recovery table and may be configured to generate the user data UD based on the first intermediate data ID1 and the second intermediate data ID2. The user data UD may include the user bits UB[0:9]. The user bits UB[0:K] may be referred to as "a condition bit CB", the user bits UB[K+1:L] may be referred to as a "first valid bit VB1", and the user bits UB[L+1:9] may be referred to as a "second valid bit VB2". Herein, "K" may be a natural number greater than or equal than 1, and "L" may be a natural number greater than or equal to K+1 and less than 9. The recovery circuit 2224 may provide the user data UD to the data queue 2230.

The recovery table may be configured to store a plurality of recovery rules respectively corresponding to a plurality of dummy bit combinations. A dummy bit combination may indicate a bit value of the first dummy bit DB1 and a bit value of the second dummy bit DB2.

When the intermediate bit IB[0] and the intermediate bit IB[5] are "0", the user bit UB[0] corresponding to the condition bit CB may be "0". The user bits UB[1:4] corresponding to the first valid bit VB1 may be the intermediate bits IB[1:4]. The user bits UB[5:9] corresponding to the second valid bit VB2 may be the intermediate bits IB[6:10].

When the intermediate bits IB[0:1] are "00" and the intermediate bits IB[5:6] are "10", the user bits UB[0:2] corresponding to the condition bit CB may be "100". The user bits UB[3:5] corresponding to the first valid bit VB1 may be the intermediate bits IB[2:4]. The user bits UB[6:9] corresponding to the second valid bit VB2 may be the intermediate bits IB[6:10].

When the intermediate bits IB[0:1] are "10" and the intermediate bits IB[5:6] are "00", the user bits UB[0:2] corresponding to the condition bit CB may be "101". The user bits UB[3:5] corresponding to the first valid bit VB1 may be the intermediate bits IB[2:4]. The user bits UB[6:9] corresponding to the second valid bit VB2 may be intermediate bits IB[7:10].

When the intermediate bit IB[0] is "0" and the intermediate bits IB[5:7] are "110", the user bits UB[0:2] corresponding to the condition bit CB may be "110". The user bits UB[3:6] corresponding to the first valid bit VB1 may be the intermediate bits IB[1:4]. The user bits UB[7:9] corresponding to the second valid bit VB2 may be the intermediate bits IB[8:10].

When the intermediate bits IB[0:1] are "01" and the intermediate bits IB[5:7] are "100", the user bits UB[0:3] corresponding to the condition bit CB may be "1110". The user bits UB[4:6] corresponding to the first valid bit VB1 may be the intermediate bits IB[2:4]. The user bits UB[7:9] corresponding to the second valid bit VB2 may be the intermediate bits IB[8:10].

When the intermediate bits IB[0:1] are "10" and the intermediate bits IB[5:8] are "0100", the user bits UB[0:4] corresponding to the condition bit CB may be "11110". The user bits UB[5:7] corresponding to the first valid bit VB1 may be the intermediate bits IB[2:4]. The user bits UB[8:9] corresponding to the second valid bit VB2 may be the intermediate bits IB[9:10].

When the intermediate bits IB[0:2] are "000" and the intermediate bits IB[5:7] are "111", the user bits UB[0:4] corresponding to the condition bit CB may be "11111". The user bits UB[5:6] corresponding to the first valid bit VB1 may be the intermediate bits IB[3:4]. The user bits UB[7:9] corresponding to the second valid bit VB2 may be the intermediate bits IB[8:10].

FIG. 10 is a table illustrating an average power value and a total area of electronic systems according to some embodiments of the present disclosure. Average power values and total areas of electronic systems according to the first, second, and third embodiments will be described with reference to FIG. 10.

The first embodiment may be a reference embodiment. For example, the first embodiment may relate to conventional PAM-3 encoding scheme in which symbol values for low power are not changed. In the first embodiment, the average power value may be about 2.28125. The average power value may refer to a DC voltage cost. The total area may be about 24.22. The total area may refer to a chip size for an encoding circuit and a decoding circuit of the electronic system.

The second embodiment may be a low-power embodiment. For example, the second embodiment may relate to PAM-3 encoding in which a power threshold value is set to "16". In the second embodiment, the average power value may be about 1.780 (reduced as much as 22% compared to the first embodiment). The total area may be about 213.876 (increased as much as 8.83 times compared to the first embodiment).

The third embodiment may be a low-power and small-size embodiment. For example, the third embodiment may relate to PAM-3 encoding in which a power threshold value is set to "18". The third embodiment may correspond to the low-power PAM-3 encoding described with reference to FIGS. 4 to 9. In the third embodiment, the average power value may be about 1.8190 (decreased as much as 20.3% compared to the first embodiment). The total area may be about 44.577 (increased as much as 1.84 times compared to the first embodiment).

As described above, in low-power PAM-3 encoding, the low power and the chip size may have a trade-off relationship. For example, when the power threshold value is set to a first threshold value, an electronic device including a transmitting circuit and a receiving circuit may use a first chip size. In contrast, when the power threshold value is set to a second threshold value less than the first threshold value, an electronic device including a transmitting circuit and a receiving circuit may use a second chip size larger than the first chip size.

Figure 11:
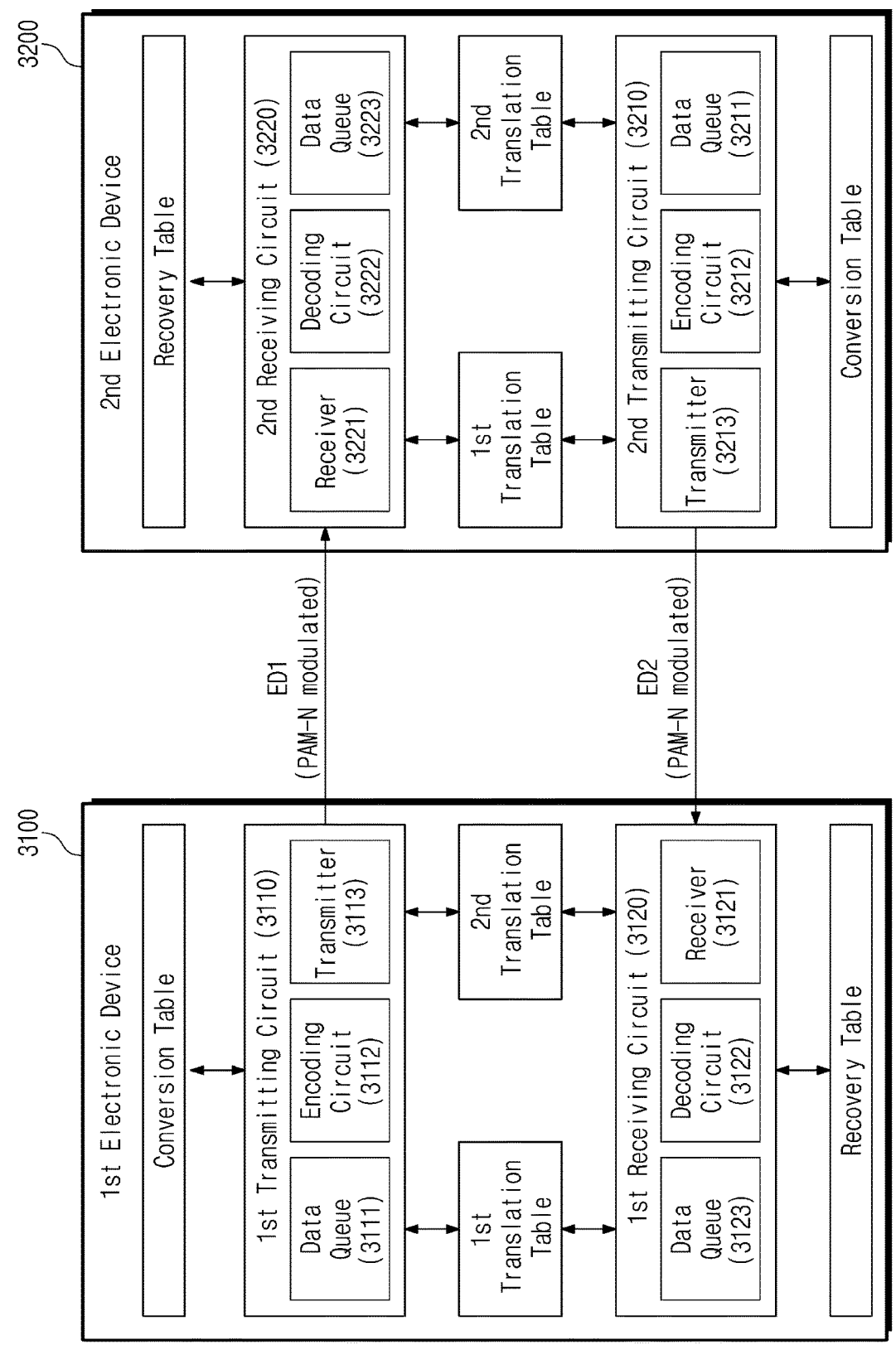
FIG. 11 is a block diagram illustrating an electronic system according to some embodiments of the present disclosure.

FIG. 11 is a block diagram illustrating an electronic system according to some embodiments of the present disclosure. Referring to FIG. 11, an electronic system 3000 may include a first electronic device 3100 and a second electronic device 3200.

The first electronic device 3100 may include a first transmitting circuit 3110, a first receiving circuit 3120, a conversion table, a first translation table, a second translation table, and a recovery table. The first transmitting circuit 3110 may include a data queue 3111, an encoding circuit 3112, and a transmitter 3113. The first receiving circuit 3120 may include a receiver 3121, a decoding circuit 3122, and a data queue 3123.

In some embodiments, the first transmitting circuit 3110 and the first receiving circuit 3120 may share the first translation table and the second translation table.

The second electronic device 3200 may include a second transmitting circuit 3210, a second receiving circuit 3220, a conversion table, a first translation table, a second translation table, and a recovery table. The second transmitting circuit 3210 may include a data queue 3211, an encoding circuit 3212, and a transmitter 3213. The second receiving circuit 3220 may include a receiver 3221, a decoding circuit 3222, and a data queue 3223.

In some embodiments, the second transmitting circuit 3210 and the second receiving circuit 3220 may share the first translation table and the second translation table.

The first transmitting circuit 3110 may be configured to load first user data of the data queue 3111. The first transmitting circuit 3110 may refer to the conversion table, the first translation table, and the second translation table and may be configured to generate first encoded data ED1 based on the first user data. The first encoded data ED1 may be a PAM-N signal modulated in compliance with the low-power PAM-N encoding. The first transmitting circuit 3110 may be configured to provide the first encoded data ED1 to the second receiving circuit 3220. The second receiving circuit 3220 may refer to the recovery table, the first translation table, and the second translation table and may be configured to generate the first user data based on the first encoded data ED1. The second receiving circuit 3220 may store the first user data in the data queue 3223.

As in the above description, the second transmitting circuit 3210 may be configured to load second user data of the data queue 3211. The second transmitting circuit 3210 may refer to the conversion table, the first translation table, and the second translation table and may be configured to generate second encoded data ED2 based on the second user data. The second encoded data ED2 may be a PAM-N signal modulated in compliance with the low-power PAM-N encoding. The second transmitting circuit 3210 may be configured to provide the second encoded data ED2 to the first receiving circuit 3120. The first receiving circuit 3120 may refer to the recovery table, the first translation table, and the second translation table and may be configured to generate the second user data based on the second encoded data ED2. The first receiving circuit 3120 may be configured to store the second user data in the data queue 3123.

Figure 12:
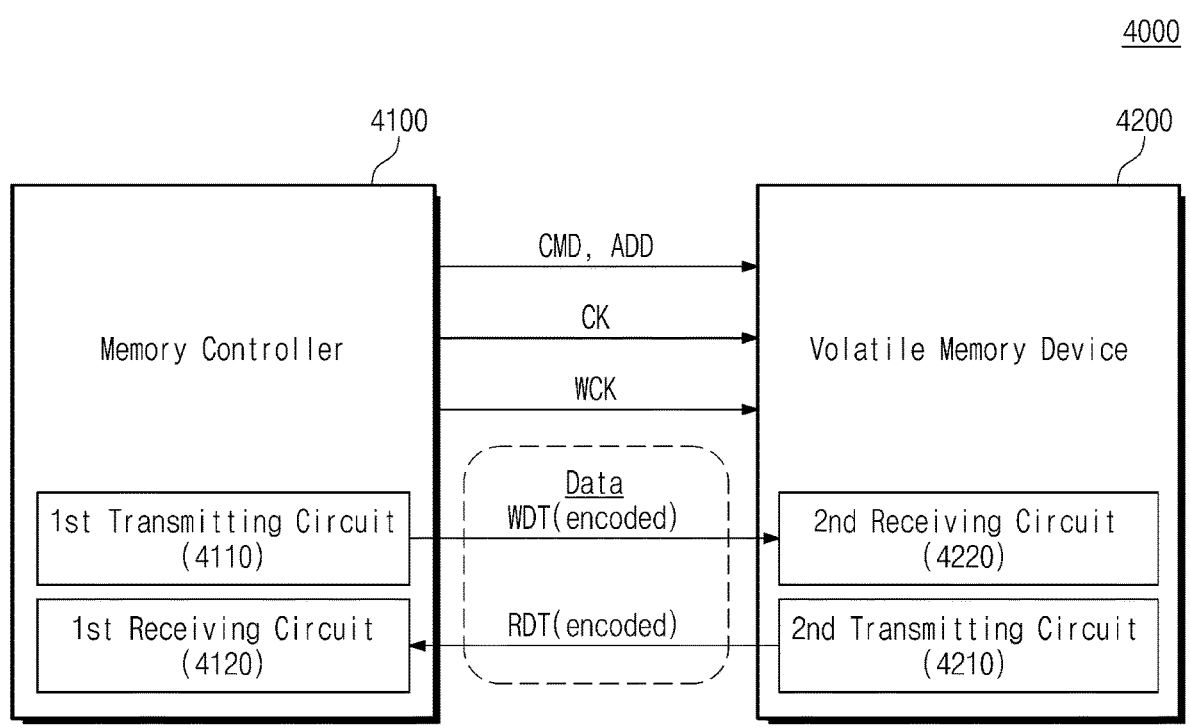
FIG. 12 is a block diagram of an electronic system according to some embodiments of the present disclosure.

FIG. 12 is a block diagram of an electronic system according to some embodiments of the present disclosure. Referring to FIG. 12, an electronic system 4000 may include a memory controller 4100 and a volatile memory device 4200. The electronic system 4000 may be implemented with a memory device, which loses data stored therein when a power is turned off, such as a DRAM or an SRAM.

Under control of a host device (not illustrated), the memory controller 4100 may be configured to store data in the volatile memory device 4200 or may read data stored in the volatile memory device 4200. The volatile memory device 4200 may store data under control of the memory controller 4100.

For example, the memory controller 4100 may be configured to provide the volatile memory device 4200 with a command CMD, an address ADD, a clock CK, and a data clock WCK. The command CMD may indicate an operation to be performed by the volatile memory device 4200. The address ADD may indicate a location of read data or write data. The clock CK may be a periodic signal that is used for synchronization of signals. The data clock WCK may be a high-speed clock signal for reading or writing data. In some embodiments, the command CMD and the address ADD may be transmitted through one physical line.

The memory controller 4100 may be configured to exchange data with the volatile memory device 4200. The data may include write data WDT to be transferred from the memory controller 4100 to the volatile memory device 4200 and read data RDT to be transferred from the volatile memory device 4200 to the memory controller 4100. The write data WDT and the read data RDT may be signals modulated in compliance with the low-power PAM-N encoding.

The memory controller 4100 may include a first transmitting circuit 4110 and a first receiving circuit 4120. The volatile memory device 4200 may include a second transmitting circuit 4210 and a second receiving circuit 4220.

The first transmitting circuit 4110 may be configured to generate the write data WDT by modulating raw write data in compliance with the low-power PAM-N encoding and may provide the write data WDT to the second receiving circuit 4220. The second receiving circuit 4220 may be configured to recover the raw write data in compliance with the low-power PAM-N decoding. The volatile memory device 4200 may be configured to store the recovered write data.

As in the above description, the second transmitting circuit 4210 may be configured to generate the read data RDT by modulating raw read data in compliance with the low-power PAM-N encoding and may be configured to provide the read data RDT to the first receiving circuit 4120. The first receiving circuit 4120 may be configured to recover the raw read data in compliance with the low-power PAM-N decoding. The memory controller 4100 may be configured to provide the recovered read data to the host device (not illustrated).

Figure 13:
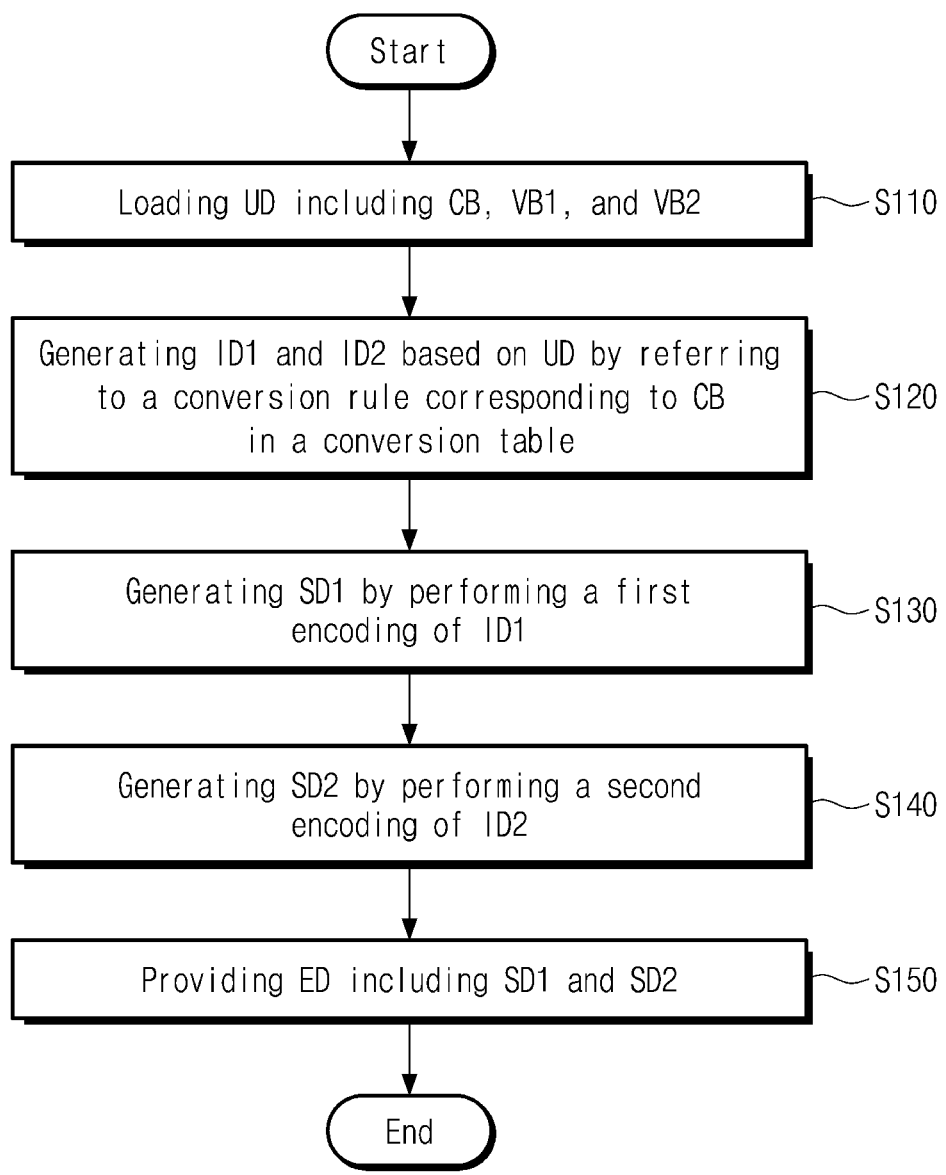
FIG. 13 is a flowchart illustrating a method of operating a transmitting circuit according to some embodiments of the present disclosure.

FIG. 13 is a flowchart illustrating a method of operating a transmitting circuit according to some embodiments of the present disclosure. A method of operating a transmitting circuit will be described with reference to FIG. 13. The transmitting circuit may correspond to the transmitting circuit 1100 of FIG. 1, the transmitting circuit 2100 of FIG. 4, the transmitting circuit 3110 or 3210 of FIG. 11, or the transmitting circuit 4110 or 4210 of FIG. 12. The transmitting circuit may include a data queue, an encoding circuit, and a transmitter. The transmitting circuit may refer to a conversion table, a first translation table, and a second translation table.

In operation S110, the transmitting circuit may load the user data UD stored in the data queue. The user data UD may include at least one condition bit CBx, the first valid bits VB1, and the second valid bits VB2.

In operation S120, the transmitting circuit may refer to a conversion rule (i.e., a target conversion rule) of the conversion table, which corresponds to the at least one condition bit CBx and thus may generate the first intermediate data ID1 and the second intermediate data ID2 based on the user data UD.

In operation S130, the transmitting circuit may generate the first symbol data SD1 by performing first encoding on the first intermediate data ID1. For example, the encoding circuit of the transmitting circuit may refer to the first translation table and may obtain the first symbol data SD1 corresponding on the first intermediate data ID1.

In operation S140, the transmitting circuit may generate the second symbol data SD2 by performing second encoding on the second intermediate data ID2. For example, the encoding circuit of the transmitting circuit may refer to the second translation table and may obtain the second symbol data SD2 corresponding on the second intermediate data ID2.

In operation S150, the transmitting circuit may provide the encoded data ED including the first symbol data SD1 and the second symbol data SD2 to a receiving circuit of an external electronic device. The encoded data ED may include a plurality of symbols that are obtained through PAM encoding. Each of the plurality of symbols may have one of a plurality of symbol values respectively corresponding to a plurality of voltage levels.

Figure 14:
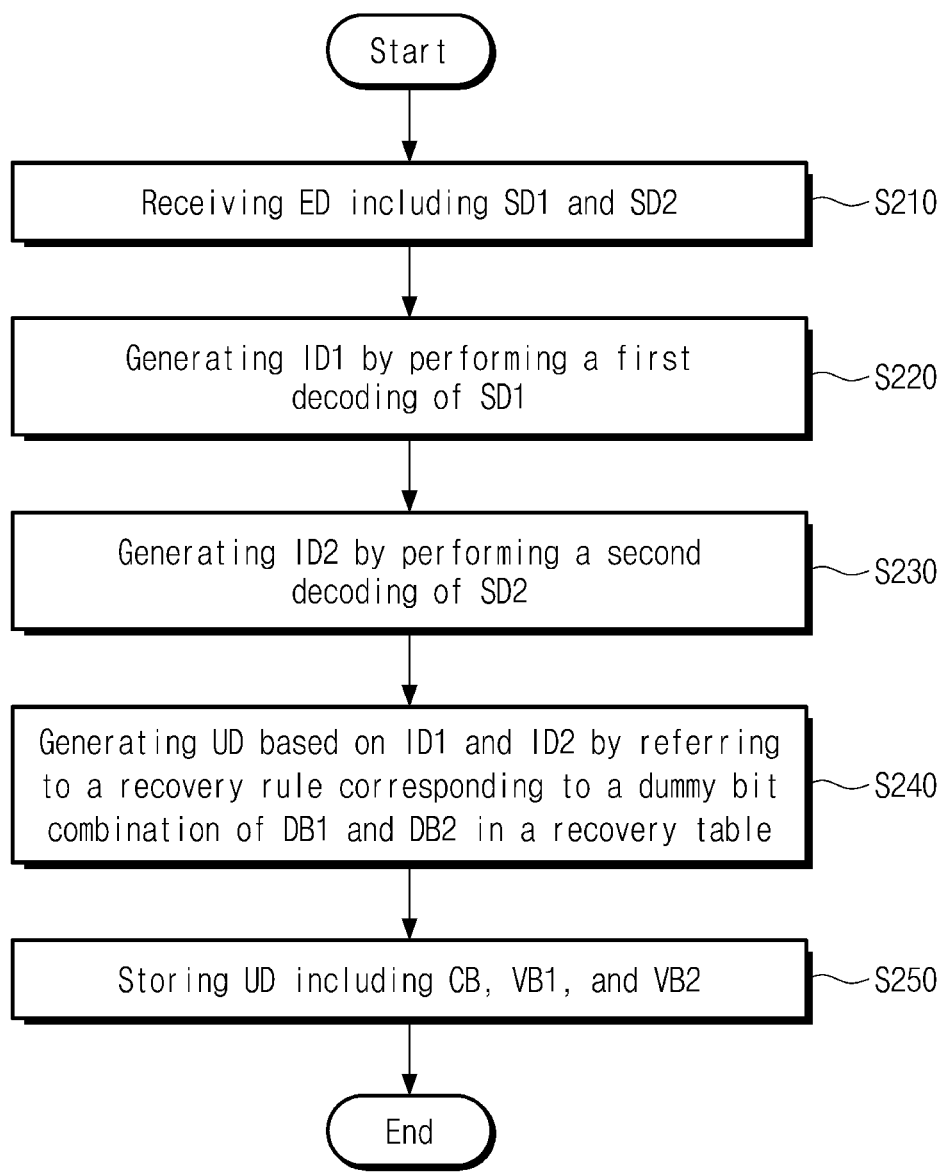
FIG. 14 is a flowchart illustrating a method of operating a receiving circuit according to some embodiments of the present disclosure.

FIG. 14 is a flowchart illustrating a method of operating a receiving circuit according to some embodiments of the present disclosure. A method of operating a receiving circuit will be described with reference to FIG. 14. The receiving circuit may correspond to the receiving circuit 1200 of FIG. 1, the receiving circuit 2200 of FIG. 4, the receiving circuit 3120 or 3220 of FIG. 11, or the receiving circuit 4120 or 4220 of FIG. 12. The receiving circuit may include a receiver, a decoding circuit, and a data queue. The receiving circuit may refer to a first translation table, a second translation table, and a recovery table.

In operation S210, the receiving circuit may receive the encoded data ED from a transmitting circuit of an external electronic device. The encoded data ED may include the first symbol data SD1 and the second symbol data SD2.

In operation S220, the receiving circuit may generate the first intermediate data ID1 by performing first decoding on the first symbol data SD1. For example, the decoding circuit of the receiving circuit may refer to the first translation table and may obtain the first intermediate data ID1 corresponding to the first symbol data SD1. The first intermediate data ID1 may include at least one first dummy bit DB1 and the first valid bits VB1.

In operation S230, the receiving circuit may generate the second intermediate data ID2 by performing second decoding on the second symbol data SD2. For example, the decoding circuit of the receiving circuit may refer to the second translation table and may obtain the second intermediate data ID2 corresponding to the second symbol data SD2. The second intermediate data ID2 may include at least one second dummy bit DB2 and the second valid bits VB2.

In operation S240, the receiving circuit may refer to a recovery rule (i.e., a target recovery rule) of the recovery table corresponding to a dummy bit combination of the at least one first dummy bit DB1 and the at least one second dummy bit DB2 and may generate the user data UD based on the first intermediate data ID1 and the second intermediate data ID2.

In operation S250, the receiving circuit may store the user data UD in the data queue. The user data UD may include at least one condition bit CBx, the first valid bits VB1, and the second valid bits VB2.

Figure 15:
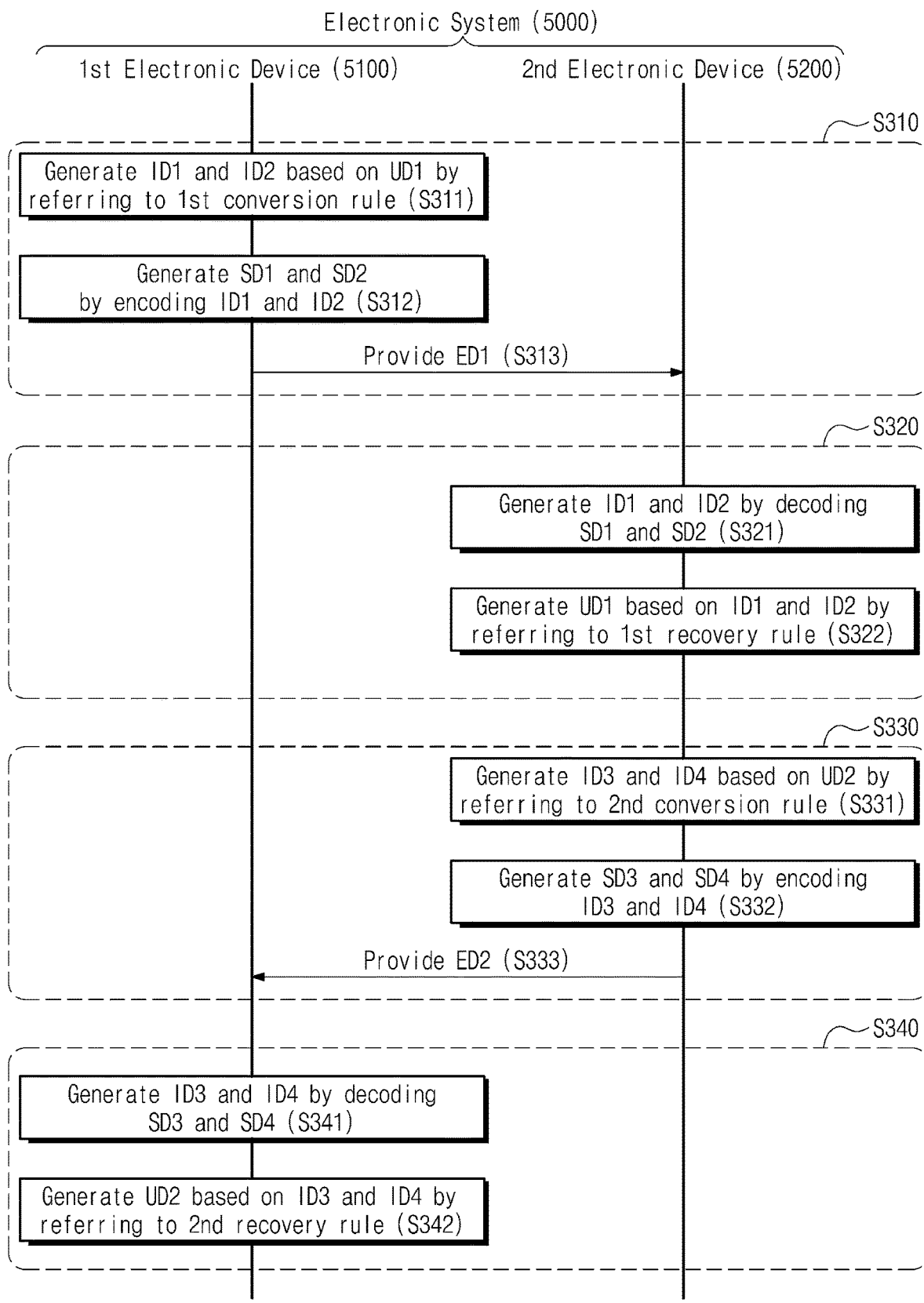
FIG. 15 is a flowchart illustrating a method of operating an electronic system according to some embodiments of the present disclosure.

FIG. 15 is a flowchart illustrating a method of operating an electronic system according to some embodiments of the present disclosure. Referring to FIG. 15, an electronic system 5000 may include a first electronic device 5100 and a second electronic device 5200. The electronic system 5000 may correspond to the electronic system 1000 of FIG. 1, the electronic system 2000 of FIG. 4, the electronic system 3000 of FIG. 11, or the electronic system 4000 of FIG. 12.

In operation S310, the first electronic device 5100 may provide the second electronic device 5200 with the first encoded data ED1 that are based on the first user data UD1. Operation S310 may include operation S311, operation S312, and operation S313. In operation S311, a transmitting circuit of the first electronic device 5100 may refer to a first conversion rule and may generate the first intermediate data ID1 and the second intermediate data ID2 based on the first user data UD1. In operation S312, the transmitting circuit of the first electronic device 5100 may generate the first symbol data SD1 and the second symbol data SD2 by encoding the first intermediate data ID1 and the second intermediate data ID2. In operation S313, the transmitting circuit of the first electronic device 5100 may provide the second electronic device 5200 with the first encoded data ED1 including the first symbol data SD1 and the second symbol data SD2.

In operation S320, a receiving circuit of the second electronic device 5200 may recover the first user data UD1 from the first encoded data ED1. Operation S320 may include operation S321 and operation S322. In operation S321 the receiving circuit of the second electronic device 5200 may generate the first intermediate data ID1 and the second intermediate data ID2 by decoding the first symbol data SD1 and the second symbol data SD2. In operation S322, the receiving circuit of the second electronic device 5200 may refer to a first recovery rule and may generate the first user data UD1 based on the first intermediate data ID1 and the second intermediate data ID2. The first recovery rule may correspond to the first conversion rule of operation 311.

In operation S330, the second electronic device 5200 may provide the first electronic device 5100 with the second encoded data ED2 that are based on the second user data UD2. Operation S330 may include operation S331, operation S332, and operation S333. In operation S331, a transmitting circuit of the second electronic device 5200 may refer to a second conversion rule and may generate third intermediate data ID3 and fourth intermediate data ID4 based on the second user data UD2. In operation S332, the transmitting circuit of the second electronic device 5200 may generate third symbol data SD3 and fourth symbol data SD4 by encoding the third intermediate data ID3 and the fourth intermediate data ID4. In operation S333, the transmitting circuit of the second electronic device 5200 may provide the first electronic device 5100 with the second encoded data ED2 including the third symbol data SD3 and the fourth symbol data SD4.

In operation S340, a receiving circuit of the first electronic device 5100 may recover the second user data UD2 from the second encoded data ED2. Operation S340 may include operation S341 and operation S342. In operation S341 the receiving circuit of the first electronic device 5100 may generate the third intermediate data ID3 and the fourth intermediate data ID4 by decoding the third symbol data SD3 and the fourth symbol data SD4. In operation S342, the receiving circuit of the first electronic device 5100 may refer to a second recovery rule and may generate the second user data UD2 based on the third intermediate data ID3 and the fourth intermediate data ID4. The second recovery rule may correspond to the second conversion rule.

According to an embodiment of the present disclosure, a transmitting circuit providing encoded data, an electronic device including the same, and a method of operating the electronic device including the same are provided.

Also, a transmitting circuit in which power consumption is reduced by decreasing the number of bit patterns having high power consumption from among bit patterns of user data through encoding and complexity of a circuit design is reduced by designing rules in consideration of a chip size, an electronic device including the same, and a method of operating the electronic device including the same are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating an electronic device which communicates with an external electronic device, the method comprising:
   loading, by a first transmitting circuit of the electronic device, first user data including at least one first condition bit, at least two first valid bits, and at least two second valid bits;
   generating, by the first transmitting circuit, first intermediate data and second intermediate data based on the first user data with reference to a target conversion rule of a conversion table of the electronic device, which corresponds to the at least one first condition bit, wherein a sum of a first power value corresponding to the first intermediate data and a second power value corresponding to the second intermediate data is less than or equal to a power threshold value;
   generating, by the first transmitting circuit, first symbol data by performing first encoding on the first intermediate data;
   generating, by the first transmitting circuit, second symbol data by performing second encoding on the second intermediate data; and
   providing, by the first transmitting circuit, first encoded data including the first symbol data and the second symbol data to a first receiving circuit of the external electronic device.

2. The method of claim 1, wherein the first encoded data include a plurality of symbols modulated in a pulse amplitude modulation (PAM) scheme, and
   wherein each of the plurality of symbols has one of a plurality of symbol values respectively corresponding to a plurality of voltage levels.

3. The method of claim 1, wherein, when a most significant bit (MSB) of the first user data has a first value, a number of the at least one first condition bit is 1, and
   wherein, when the MSB of the first user data has a second value, the number of the at least one first condition bit is greater than 1.

4. The method of claim 1, wherein the conversion table includes a plurality of conversion rules respectively corresponding to a plurality of condition bits,
   wherein each of a plurality of maximum power values corresponding to the plurality of conversion rules is less than or equal to the power threshold value,
   wherein the plurality of condition bits include the at least one first condition bit, and
   wherein the plurality of conversion rules include the target conversion rule.

5. The method of claim 1, wherein the target conversion rule indicates at least one first dummy bit and at least one second dummy bit corresponding to the at least one first condition bit.

6. The method of claim 5, wherein the first intermediate data include the at least one first dummy bit and the first valid bits, and wherein the second intermediate data include the at least one second dummy bit and the second valid bits.

7. The method of claim 1, wherein the generating of the first symbol data by performing the first encoding on the first intermediate data by the first transmitting circuit includes:
obtaining, by the first transmitting circuit, the first symbol data corresponding to the first intermediate data with reference to a first translation table of the electronic device, and
wherein the generating of the second symbol data by performing the second encoding on the second intermediate data by the first transmitting circuit includes:
obtaining, by the first transmitting circuit, the second symbol data corresponding to the second intermediate data with reference to a second translation table of the electronic device.

8. The method of claim 7, wherein a number of bits of the second intermediate data is greater than a number of bits of the first intermediate data,
wherein a number of symbols of the second symbol data is greater than a number of symbols of the first symbol data, and
wherein a translation rule of the second translation table refers to a translation rule of the first translation table.

9. The method of claim 1, wherein the providing of the first encoded data including the first symbol data and the second symbol data to the first receiving circuit of the external electronic device by the first transmitting circuit includes:
generating, by a serializer of the first transmitting circuit, the first encoded data by serializing the first symbol data and the second symbol data; and
outputting, by the serializer, the first encoded data to the first receiving circuit of the external electronic device.

10. The method of claim 1, further comprising:
receiving, at a second receiving circuit of the electronic device, second encoded data including third symbol data and fourth symbol data from a second transmitting circuit of the external electronic device;
generating, by the second receiving circuit, third intermediate data including at least one third dummy bit and third valid bits by performing first decoding on the third symbol data;
generating, by the second receiving circuit, fourth intermediate data including at least one fourth dummy bit and fourth valid bits by performing second decoding on the fourth symbol data; and
generating, by the second receiving circuit, second user data based on the third intermediate data and the fourth intermediate data with reference to a target recovery rule of a recovery table of the electronic device, which corresponds to a dummy bit combination of the at least one third dummy bit and the at least one fourth dummy bit.

11. The method of claim 10, wherein the target recovery rule indicates at least one second condition bit corresponding to the dummy bit combination of the at least one third dummy bit and the at least one fourth dummy bit, and
wherein the second user data include the at least one second condition bit, the third valid bits, and the fourth valid bits.

12. The method of claim 10, wherein the recovery table includes a plurality of recovery rules respectively corresponding to a plurality of dummy bit combinations,
wherein the plurality of recovery rules respectively correspond to a plurality of conversion rules of the conversion table,
wherein the plurality of dummy bit combinations includes the dummy bit combination of the at least one third dummy bit and the at least one fourth dummy bit, and
wherein the plurality of recovery rules include the target recovery rule.

13. The method of claim 1, wherein, when the power threshold value is set to a first threshold value, the electronic device uses a first chip size, and
wherein, when the power threshold value is set to a second threshold value less than the first threshold value, the electronic device uses a second chip size larger than the first chip size.

14. The method of claim 1, wherein a receiving terminal of the first receiving circuit of the external electronic device receives a power supply voltage higher than a ground voltage,
wherein the first encoded data include a plurality of symbols modulated by a PAM-3 scheme, and
wherein each of the plurality of symbols includes:
a first symbol value corresponding to a first voltage level and the first power value;
a second symbol value corresponding to a second voltage level higher than the first voltage level and the second power value lower than the first power value; or
a third symbol value corresponding to a third voltage level higher than the second voltage level and a third power value lower than the second power value.

15. The method of claim 1, wherein the electronic device comprises a volatile memory device or a memory controller configured to control the volatile memory device.

16. A transmitting circuit comprising:
a data queue configured to store user data including at least one condition bit, at least two first valid bits, and at least two second valid bits;
a conversion table configured to store a plurality of conversion rules;
an encoding circuit; and
a transmitter configured to provide encoded data to a receiver,
wherein the encoding circuit is configured to:
receive the user data from the data queue;
generate first intermediate data and second intermediate data based on the user data with reference to a target conversion rule corresponding to the at least one condition bit from among the plurality of conversion rules of the conversion table;
generate first symbol data by performing first encoding on the first intermediate data;
generate second symbol data by performing second encoding on the second intermediate data; and
generate the encoded data by serializing the first symbol data and the second symbol data, and
wherein each of a plurality of maximum power values corresponding to the plurality of conversion rules is less than or equal to a power threshold value.

17. The transmitting circuit of claim 16, wherein the encoding circuit includes:
a conversion circuit configured to receive the user data from the data queue and to generate the first intermediate data and the second intermediate data based on the user data with reference to the target conversion rule of the conversion table;
a first encoder configured to generate the first symbol data by performing the first encoding on the first intermediate data;

a second encoder configured to generate the second symbol data by performing the second encoding on the second intermediate data; and a serializer configured to generate the encoded data by serializing the first symbol data and the second symbol data and to output the encoded data to the receiver.

18. An electronic device which communicates with an external electronic device, comprising:

a conversion table configured to store a plurality of conversion rules;

a transmitting circuit configured to generate first encoded data based on first user data with reference to the conversion table and to provide the first encoded data to the external electronic device;

a recovery table configured to store a plurality of recovery rules; and a receiving circuit configured to receive second encoded data from the external electronic device and to generate second user data based on the second encoded data with reference to the recovery table, wherein the transmitting circuit is configured to:

load the first user data including at least one first condition bit, at least two first valid bits, and at least two second valid bits from a first data queue of the transmitting circuit;

generate first intermediate data and second intermediate data based on the first user data with reference to a target conversion rule corresponding to the at least one first condition bit from among the plurality of conversion rules of the conversion table;

generate first symbol data by performing first encoding on the first intermediate data;

generate second symbol data by performing second encoding on the second intermediate data; and generate the first encoded data by serializing the first symbol data and the second symbol data, and wherein each of a plurality of maximum power values corresponding to the plurality of conversion rules is less than or equal to a power threshold value.

19. The electronic device of claim 18, wherein the target conversion rule indicates at least one first dummy bit and at least one second dummy bit corresponding to the at least one first condition bit, wherein the first intermediate data include the at least one first dummy bit and the first valid bits, and wherein the second intermediate data include the at least one second dummy bit and the second valid bits.

20. The electronic device of claim 18, wherein the receiving circuit includes:

a receiver configured to receive the second encoded data including third symbol data and fourth symbol data from the external electronic device;

a decoding circuit configured to generate the second user data based on the second encoded data with reference to the recovery table; and a second data queue configured to store the second user data, wherein the decoding circuit is further configured to:

generate the third symbol data and the fourth symbol data by deserializing the second encoded data received from the receiver;

generate third intermediate data including at least one third dummy bit and third valid bits by performing first decoding on the third symbol data;

generate fourth intermediate data including at least one fourth dummy bit and fourth valid bits by performing second decoding on the fourth symbol data; and generate the second user data based on the third intermediate data and the fourth intermediate data with reference to a target recovery rule corresponding to a dummy bit combination of the at least one third dummy bit and the at least one fourth dummy bit from among the plurality of recovery rules of the recovery table, wherein the target recovery rule indicates at least one second condition bit corresponding to the dummy bit combination of the at least one third dummy bit and the at least one fourth dummy bit, and wherein the second user data include the at least one second condition bit, the third valid bits, and the fourth valid bits.

* * * * *